(12) United States Patent
Makino et al.

(10) Patent No.: US 7,733,548 B2
(45) Date of Patent: Jun. 8, 2010

(54) IMAGE READING APPARATUS

(75) Inventors: Yoichiro Makino, Kawasaki (JP); Koji Kobayashi, Yokohama (JP); Nobuyuki Bannai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 11/781,691

(22) Filed: Jul. 23, 2007

(65) Prior Publication Data

US 2008/0024845 A1 Jan. 31, 2008

(30) Foreign Application Priority Data

Jul. 28, 2006 (JP) .............................. 2006-205941
Jun. 26, 2007 (JP) .............................. 2007-167462

(51) Int. Cl.
*G03F 3/08* (2006.01)
*H04N 1/46* (2006.01)
*G03B 27/04* (2006.01)
*G03G 15/00* (2006.01)

(52) U.S. Cl. ........................ 358/520; 358/505; 358/474; 355/82; 399/362

(58) Field of Classification Search ................. 358/518, 358/538, 520, 1.2, 1.1, 1.9, 505, 474, 504, 358/526; 382/274; 355/25, 82; 399/362
See application file for complete search history.

(56) References Cited

U.S. PATENT DOCUMENTS

| | | | | |
|---|---|---|---|---|
| 5,677,776 A | * | 10/1997 | Matsuda et al. | 358/475 |
| 5,726,775 A | * | 3/1998 | Walsh | 358/488 |
| 5,760,925 A | * | 6/1998 | Saund et al. | 358/497 |
| 5,764,383 A | * | 6/1998 | Saund et al. | 358/497 |
| 5,801,849 A | * | 9/1998 | Soloveychik et al. | 358/474 |
| 5,969,795 A | * | 10/1999 | Honda | 355/25 |
| 6,041,146 A | * | 3/2000 | Kamon et al. | 382/274 |
| 6,313,954 B1 | * | 11/2001 | Tai | 359/668 |
| 6,345,763 B1 | * | 2/2002 | Matsuda et al. | 235/459 |
| 6,665,128 B1 | * | 12/2003 | Tai | 359/668 |
| 6,816,624 B1 | * | 11/2004 | Ebisawa et al. | 382/275 |
| 6,859,233 B1 | * | 2/2005 | Sasama | 348/349 |
| 7,072,527 B1 | * | 7/2006 | Nako | 382/290 |
| 7,477,426 B2 | * | 1/2009 | Guan et al. | 358/474 |
| 2001/0021042 A1 | * | 9/2001 | Hirota et al. | 358/505 |
| 2002/0085247 A1 | * | 7/2002 | Xu et al. | 358/504 |
| 2003/0198398 A1 | * | 10/2003 | Guan et al. | 382/255 |

FOREIGN PATENT DOCUMENTS

| | | |
|---|---|---|
| JP | 11-041455 A | 2/1999 |
| JP | 2000-20682 A | 1/2000 |
| JP | 2003-152977 A | 5/2003 |
| JP | 2005-115768 A | 4/2005 |

* cited by examiner

*Primary Examiner*—Madeleine A Nguyen
(74) *Attorney, Agent, or Firm*—Canon U.S.A., Inc., IP Division

(57) ABSTRACT

A method is provided for processing image data read from a book document placed on a platen of an image reading apparatus. The method includes determining a background pixel of the image data based on a luminance difference or a color difference between neighboring pixel arrays, identifying a shadow region based on a luminance change between the neighboring background pixel arrays, discriminatively detecting a shadow of a binding portion and a shadow of a front edge in a document region with reference to a changing direction of shadow luminance, and performing a luminance correction on the shadow region according to characteristics of the shadows.

17 Claims, 25 Drawing Sheets

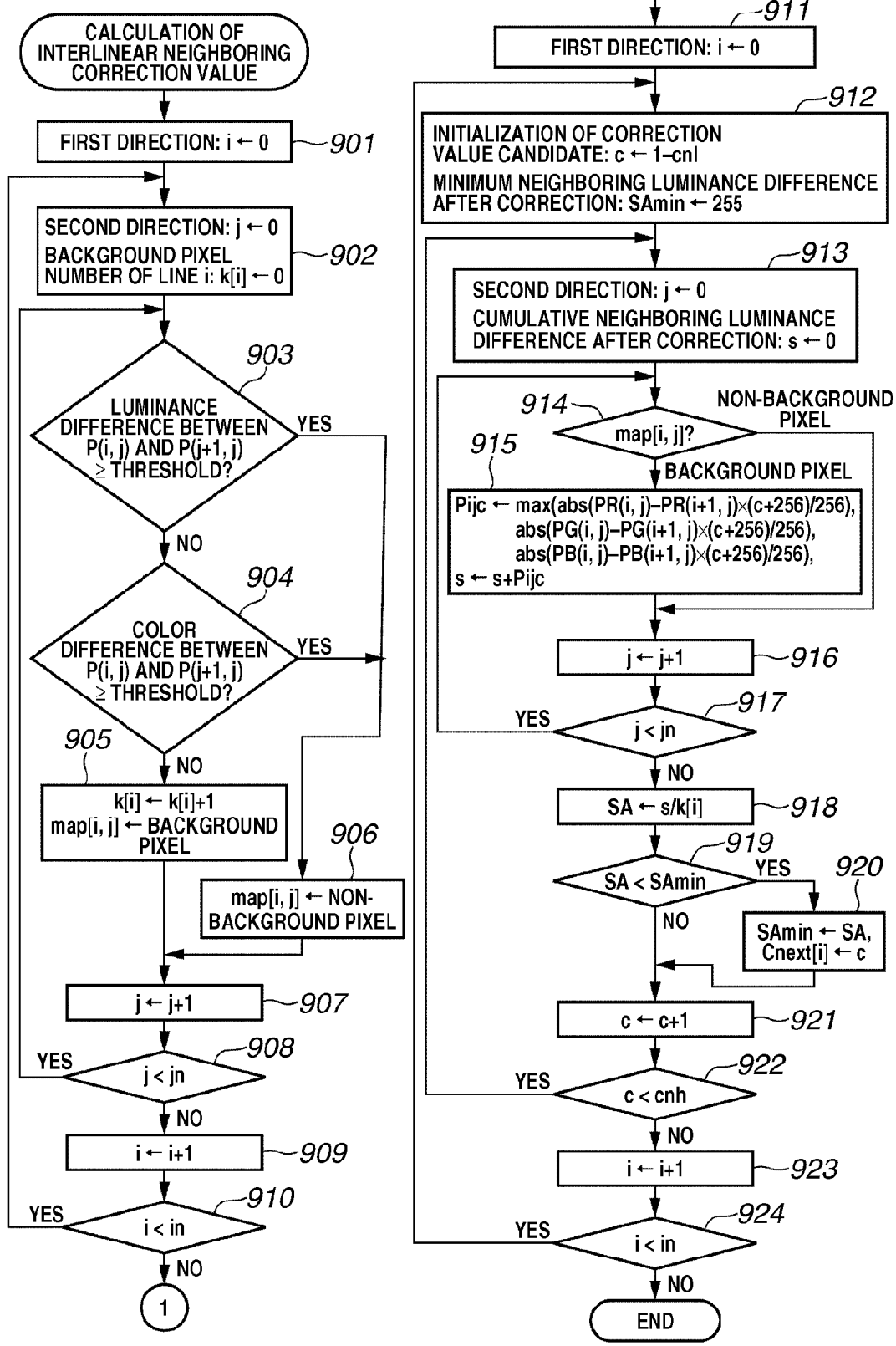

INTERLINEAR NEIGHBORING CORRECTION VALUE
(X-DIRECTION: MAIN SCANNING DIRECTION)

INTERLINEAR NEIGHBORING CORRECTION VALUE
(Y-DIRECTION: SUB SCANNING DIRECTION)

INTERLINEAR NEIGHBORING CORRECTION MAGNIFICATION
(X-DIRECTION: MAIN SCANNING DIRECTION)

INTERLINEAR NEIGHBORING CORRECTION MAGNIFICATION
(Y-DIRECTION: SUB SCANNING DIRECTION)

INTERLINEAR CUMULATIVE CORRECTION MAGNIFICATION
(X-DIRECTION: MAIN SCANNING DIRECTION)

INTERLINEAR CUMULATIVE CORRECTION MAGNIFICATION
(Y-DIRECTION: SUB SCANNING DIRECTION)

FIG.12

TWO COMPARATIVE EXAMPLES OF SHADOW GRADATION PORTION CANDIDATE
BASED ON INTERLINEAR CUMULATIVE CORRECTION MAGNIFICATION

| | 1.0~1.2 | ~1.4 | ~1.6 | ~1.8 | ~2.0 | ~2.2 | ~2.4 | ~2.6 |
|---|---|---|---|---|---|---|---|---|
| SHADOW GRADATION PORTION CANDIDATE P (CLEAR SHADOW) | 3 | <u>1</u> | <u>2</u> | 2 | <u>2</u> | <u>1</u> | <u>1</u> | <u>1</u> |
| SHADOW GRADATION PORTION CANDIDATE Q (OTHER CHANGE) | <u>4</u> | 0 | 0 | <u>3</u> | 1 | 0 | 0 | 0 |

- CORRECTION MAGNIFICATION VALUE OF UPPER-SIDE BINDING PORTION (LEFT)
- CORRECTION COEFFICIENT BASED ON UPPER-SIDE DETAILED ANALYSIS
- NORMALIZED CUMULATIVE VALUE

- CORRECTION MAGNIFICATION VALUE OF LOWER-SIDE BINDING PORTION (LEFT)
- CORRECTION COEFFICIENT BASED ON LOWER-SIDE DETAILED ANALYSIS
- NORMALIZED CUMULATIVE VALUE

IMAGE READING APPARATUS

BACKGROUND OF THE INVENTION

1. Field of the Invention

The present invention relates to an image processing method for processing image data generated by an image reading apparatus (e.g., an image scanner, a copying machine, or a multifunction peripheral).

2. Description of the Related Art

When a user copies a page of a book (or a magazine), the user typically lays the book face-down on a transparent platen of an image scanner or a copying machine so that a reading unit installed inside the apparatus body can read the spread document through the platen.

If the reading operation is performed in this manner, a binding portion (i.e., a region extending along the border of right and left pages) or each front edge (i.e., a free edge of each page opposed to the binding portion) of the book may be held in a floating state with a significant clearance from the platen.

As a result, an output image resulting from read image data may include a shadow of the binding portion or the front edge of a book. In particular, if characters are involved in a dark portion of an image, these characters may not be recognized correctly.

If a copying machine prints an image including image data causing dark portions, the copying machine may consume a large amount of toner or ink.

Although the clearance between the binding portion and the platen can be reduced by pressing a book along its backbone (a folding line), the book may be damaged when a strong force is applied by a user.

As another correction method, luminance distribution information of an image can be used to estimate a 3-dimensional shape (i.e., a floating state) of a document. For example, the "Shape from Shading" method is discussed in T. Wada, H. Uchida and T. Matsuyama, "Shape from Shading with Interreflections under a Proximal Light Source: Distortion-Free Copying of an Unfolded Book", International Journal Computer Vision 24(2), p 125-135(1997).

However, the "Shape from Shading" method requires a long processing time for a great amount of calculations in the correction processing.

An image correction apparatus discussed in Japanese Patent Application Laid-Open No. 11-41455 can effectively perform a correction with a small calculation amount based on a 3-dimensional shape of a book estimated from the shape of a page contour line involved in a read image.

Furthermore, as discussed in Japanese Patent Application Laid-Open No. 2000-20682, the floating height of a binding portion at an upper end of a document placed on a platen may be different from the floating height at a lower end if a pressing force is unevenly applied to the document.

The correction method discussed in Japanese Patent Application Laid-Open No. 2000-20682 can correct shadows of top and bottom regions of a binding portion with reference to the shape of a page contour line which varies depending on the floating state of a document.

However, the shadow correction based on the shape of a page contour line requires a reducing optical system as an image reading apparatus and is only applicable to a binding portion extending in the aligning direction of pixels of a reading line sensor.

A method discussed in Japanese Patent Application Laid-Open No. 2003-152977 detects a shadow region as a sequence of points where the luminance changes, and determines whether a document image includes one page or two pages based on a comparison between the orientation of a text in the image and the direction of the detected shadow.

If it is determined that the document image does not include two pages, the method further determines whether the detected shadow is a target shadow of a binding portion (i.e., a shadow to be corrected) based on a comparison between features of the detected shadow and features of a peripheral shadow. If it is determined that the document image includes only one page, the method does not perform a correction.

A method discussed in Japanese Patent Application Laid-Open No. 2005-115768 identifies the hue of a background portion in document image data, and applies a luminance correction to a pixel having a hue similar to the identified hue of the background.

When a user places a book document (e.g., a book or a magazine) on a platen of a scanner, the user can select a vertical placement or a horizontal placement of the document as a preparatory operation prior to the correction processing applied to the shadow of a binding portion or a front edge. According the vertical placement, the binding portion of a book document is parallel to a sub scanning direction (i.e., a moving direction of a reading optical unit). According to the horizontal placement, the binding portion of a book document is parallel to a main scanning direction (i.e., an aligning direction of an image reading sensor).

A conventional correction method discussed in Japanese Patent Application Laid-Open No. 11-41455 restricts the placement of a book document to only one direction. A conventional correction method discussed in Japanese Patent Application Laid-Open No. 2003-152977 corrects the inclination of a book document before performing the correction processing.

A compact image reading apparatus has a small platen comparable to the Letter size. If the opening direction of a platen cover is restricted, a spread book document may not be laid in a designated direction. Therefore, the image reading apparatus may not be able to read spread pages of the book document and all contour lines of the document and may not be able to obtain appropriate correction results.

A magazine image or a color document image generally includes a surrounding of characters, such as design, pattern, photograph, etc. If a character/graphic region is different in color from the background, an image of the character/graphic region may include shadows resulting from the surrounding other than the characters.

SUMMARY OF THE INVENTION

According to an aspect of the present invention, an embodiment is directed to a method for processing image data read from a book document placed on a platen. The method includes determining a target pixel of the image data as a background pixel when a difference between the target pixel and a neighboring pixel is less than a threshold (step 1); performing a preliminary luminance correction calculation using a same correction value candidate for a luminance value of a background pixel positioned on a line parallel to a binding portion of the book document (step 2); integrating an absolute value of a difference between a value obtained by the preliminary luminance correction calculation and a luminance value of a neighboring background pixel positioned at one side of the line with respect to background pixels on the line, and selecting a correction value candidate that minimizes the integrated value among a plurality of correction value candidates as a correction value of the background pixel on the line (step 3); calculating a cumulative luminance correction value for each line by successively performing a luminance correction calculation in neighboring order of the line based on the selected correction value (step 4); extracting a shadow region of at least one of a shadow of a binding portion or a shadow of a front edge portion involved in the image data based on the cumulative luminance correction value (step 5); and performing a luminance correction on the shadow region based on the cumulative luminance correction value (step 6).

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 7 is a flowchart illustrating shadow luminance feature calculating processing in the image analysis according to a second exemplary embodiment of the present invention.

FIG. 12 illustrates exemplary processing for comparing shadow gradation portions based on interlinear cumulative correction magnifications.

DETAILED DESCRIPTION OF THE EMBODIMENTS

Figure 1:
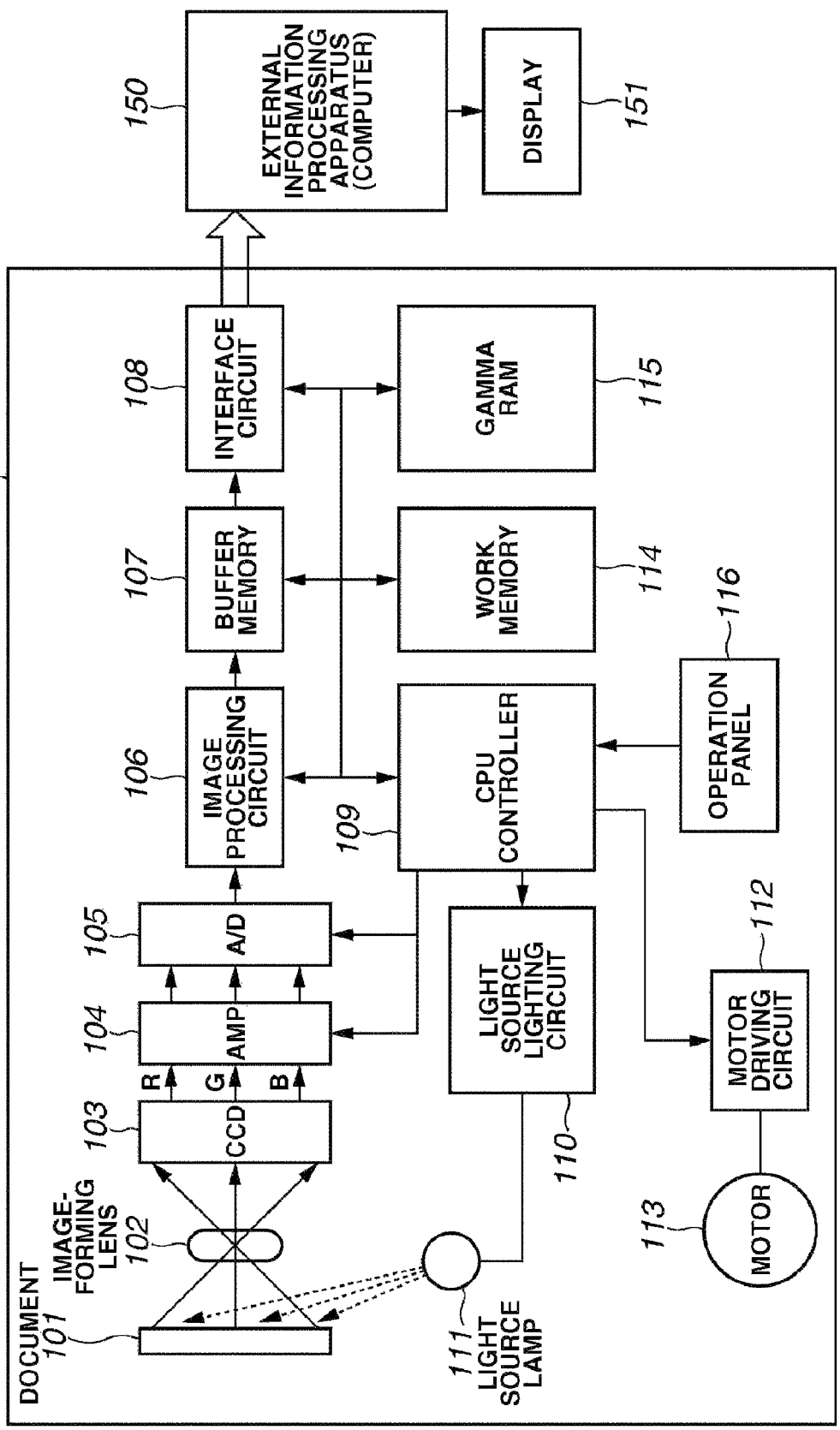
FIG. 1 is a block diagram illustrating an example arrangement of an image reading apparatus that performs image processing according to a first exemplary embodiment of the present invention.

The following description of exemplary embodiments is illustrative in nature and is in no way intended to limit the invention, its application, or uses.

Processes, techniques, apparatus, and systems as known by one of ordinary skill in the art are intended to be part of the enabling description where appropriate.

It is noted that throughout the specification, similar reference numerals and letters refer to similar items in the following figures, and thus once an item is described in one figure, it may not be discussed for following figures.

Exemplary embodiments will be described in detail below with reference to the drawings.

First Exemplary Embodiment

FIG. 1 is a block diagram illustrating an example arrangement of an image reading apparatus and an external information processing apparatus. In FIG. 1, an image reading apparatus 100 is operable to read a document 101 to generate image data. A light source lamp 111 illuminates the document 101. Reflection light having an intensity corresponding to the density of a document surface enters an image-forming lens 102 that forms an image on a line image sensor 103, such as a charge-coupled device (CCD) sensor or other solid-state image sensor. A light source lighting circuit 110 controls lighting of the light source lamp 111.

An amplifier 104 amplifies an analog image signal output from the line image sensor 103. A motor driving circuit 112 controls a driving motor 113 (e.g., a stepping motor) that drives an optical system. A central processing unit (CPU) controller 109 functions as a system control unit of the image reading apparatus 100. The motor driving circuit 112 outputs an excitation signal to the driving motor 113 based on a control signal supplied from the CPU controller 109.

An A/D converter 105 converts an analog image signal output from the amplifier 104 into a digital image signal. An image processing circuit 106 applies image processing to the digital image signal. The image processing includes offset correction, shading correction, digital gain adjustment, color balance adjustment, color masking conversion, and resolution conversion in the main scanning direction and the sub scanning direction.

A buffer memory 107, constructed from a random access memory (RAM), can temporarily store image data. An interface circuit 108 controls transmission/reception of commands and image data between the image reading apparatus 100 and the external information processing apparatus 150. The interface circuit 108 is, for example, small computer system interface (SCSI), Parallel, universal serial bus (USB), or IEEE1394. A work memory 114 can function as a temporary work memory for the image processing circuit 106 that performs image processing. The work memory 114 can be used for the correction of RGB interlinear offsets of image signals obtained from RGB line sensors disposed in parallel with each other at predetermined offset intervals on the line image sensor 103.

Furthermore, the work memory 114 can temporarily store various data including shading correction data. A gamma random access memory (RAM) 115 stores a luminance gamma conversion look-up table (LUT) and performs a gamma correction. The CPU controller 109 controls the image reading apparatus 100 based on a command supplied from the external information processing apparatus 150. The CPU controller 109 controls the motor driving circuit 112, the light source lighting circuit 110, and the image processing circuit 106. The CPU controller 109 receives a signal from an operation panel 116 including various switches that enable a user to operate the image reading apparatus 100. The CPU controller 109 sends an operation signal, via the interface circuit 118, to the external information processing apparatus 150.

The external information processing apparatus 150 is a personal computer or a host computer (hereinafter referred to as "PC 150") that is associated with a monitor display 151. The image reading apparatus 100 uses one white light source 111 and a three-line image sensor (CCD sensor) 103 which reads three (RGB) colors. Alternatively, the image reading apparatus 100 can use a contact image sensor (CIS) including a single line image sensor and light sources of three (RGB) colors which can be selectively turned on and off.

Figure 2:
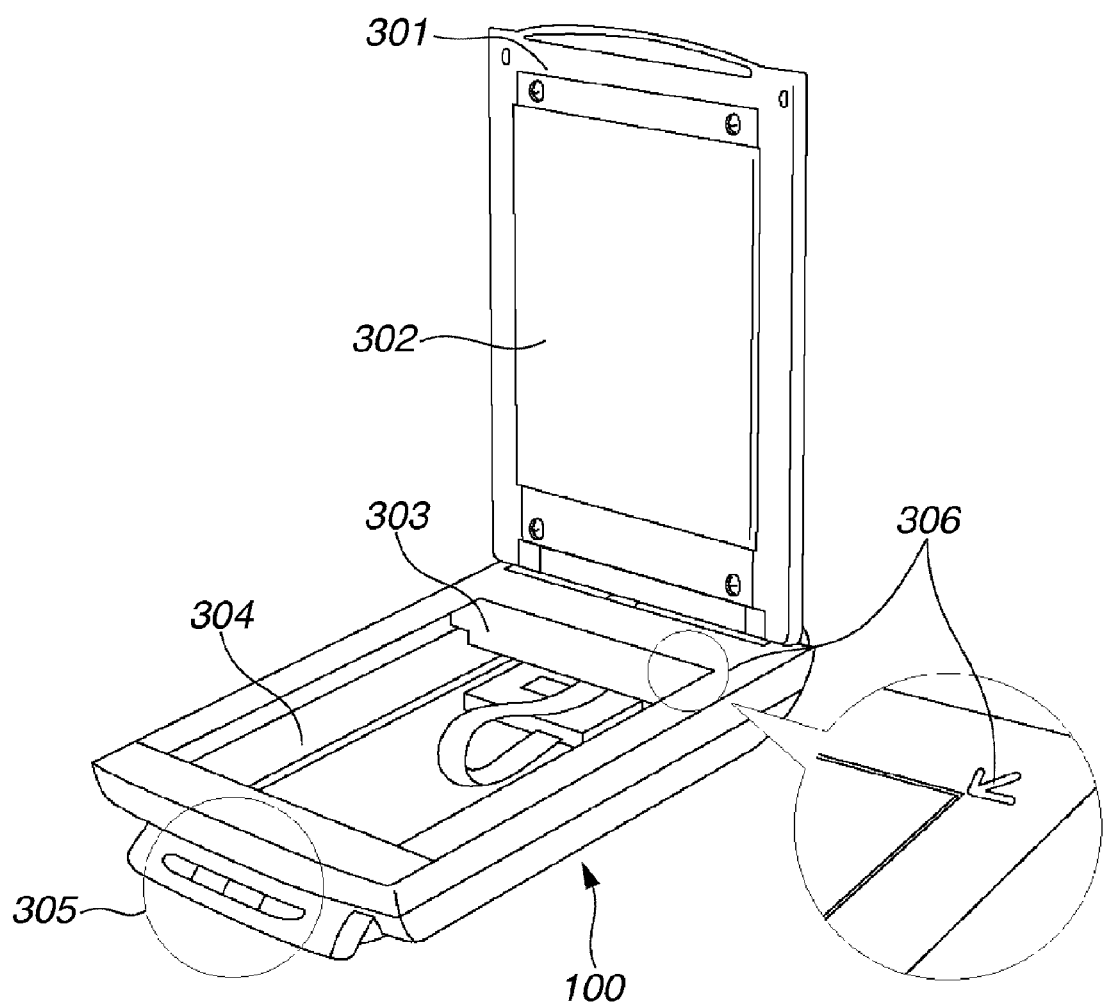
FIG. 2 is a perspective view illustrating an appearance of the image reading apparatus according to the first exemplary embodiment of the present invention.

FIG. 2 is a perspective diagram illustrating an appearance of the image reading apparatus 100 according to the first embodiment. The image reading apparatus 100 includes a document pressing plate 301, a white sheet 302, a reading unit (an optical reading system) 303, a platen 304, and an operation panel 305.

The document pressing plate 301 can be used to stably press a document placed on the platen 304. The white sheet 302 attached to the document pressing plate 301 serves to put a thin sheet document placed on the platen 304 into firm contact with the platen 304 and turn the marginal region of a document into white image data. The platen 304 has a flat surface on which a document with a reading surface facing downward is laid. The operation panel 305 enables a user to input an instruction (e.g., start of a reading operation) and sends the input instruction to the PC 150 (i.e., a destination to which image data is transmitted). The image reading apparatus 100 starts a reading operation of a document placed on the platen 304 from a document reference position indicated by a mark 306.

The above-described image reading apparatus 100 performs the following document image reading operation. When the image reading apparatus 100 receives a reading command from the PC 150, the CPU controller 109 initializes each circuit illustrated in FIG. 1. Then, the CPU controller 109 controls the motor driving circuit 112 to rotate the motor 113. The reading unit 303 moves in the sub scanning direction when driven by the motor 113 via a gear unit (not illustrated) and a driving belt (not illustrated).

In synchronism with the moving operation of the reading unit 303, the CPU controller 109 causes the CCD 103 to read luminance information of a document surface positioned just above the optical unit which is illuminated by the light source lamp 111 and causes the A/D converter 105 to convert the read information into a digital electric signal.

The image signal (after having been converted into a digital electric signal) is supplied to the image processing circuit 106, which performs predetermined image processing (e.g., resolution conversion, luminance conversion, etc). Then, the processed image signal is successively transmitted to the PC 150 via the interface circuit 108. Thus, the image data of a document placed on the platen 304 can be stored in the PC 150, which performs the following image processing.

There are various types of bookbinding methods (e.g., saddle stitch binding, edge binding, gluing, wire binding, and thread sewing). In the following description, a "book document" represents a book type document obtainable from any one of the bookbinding methods. In the following description, one side of a book where the book is stitched is referred to as a "binding portion", while the other side opposed to the binding portion where the book is freely opened is referred to as a "front edge." In an image, a shadow formed by the binding portion is referred to as a "shadow of the binding portion" and a shadow formed by the front edge is referred to as a "shadow of the front edge portion."

If a read image includes a dark portion (i.e., shadow) which may be caused by an altitudinal clearance between a binding portion and/or a front edge of a book document and the platen 304, the image processing system performs shadow luminance correction processing as described below in detail with reference to the drawings.

The image processing system performs the shadow luminance correction processing in response to an instruction of a user who instructs that the document to be read is a book document. In an exemplary embodiment, the image reading apparatus 100 reads an image and the PC 150 processes the read image.

Figure 3A:
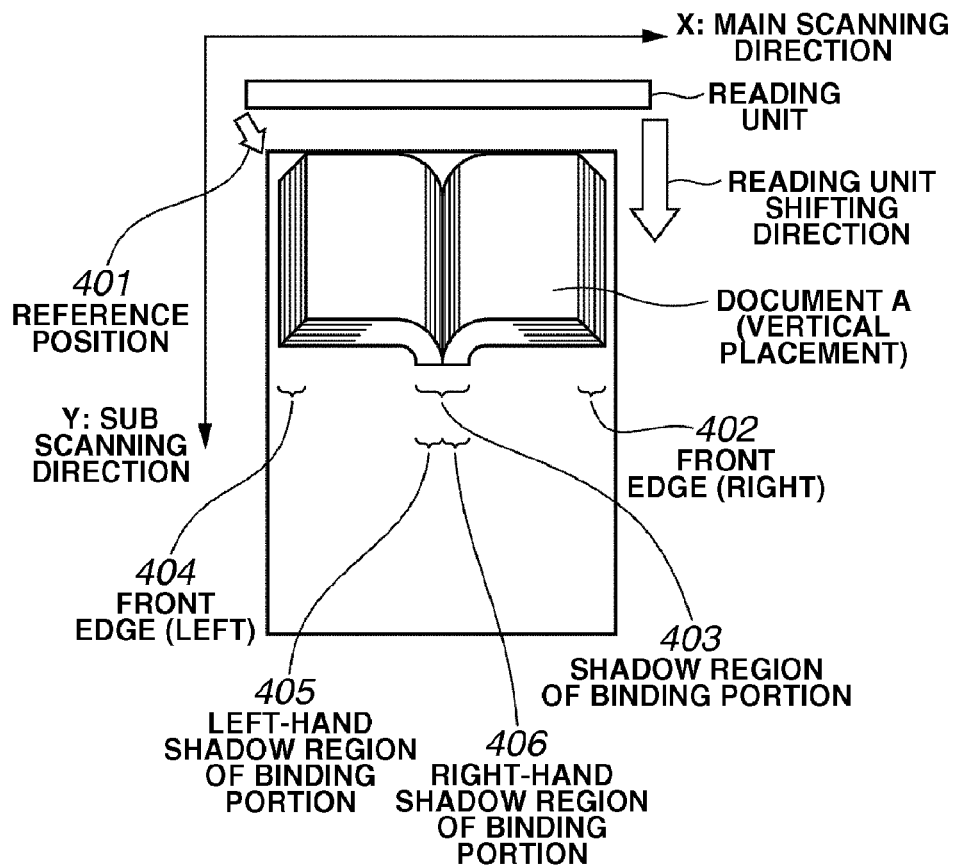
FIGS. 3A and 3B illustrate two placements of a book document placed on a platen of the image reading apparatus according to the first exemplary embodiment of the present invention.
Figure 3B:
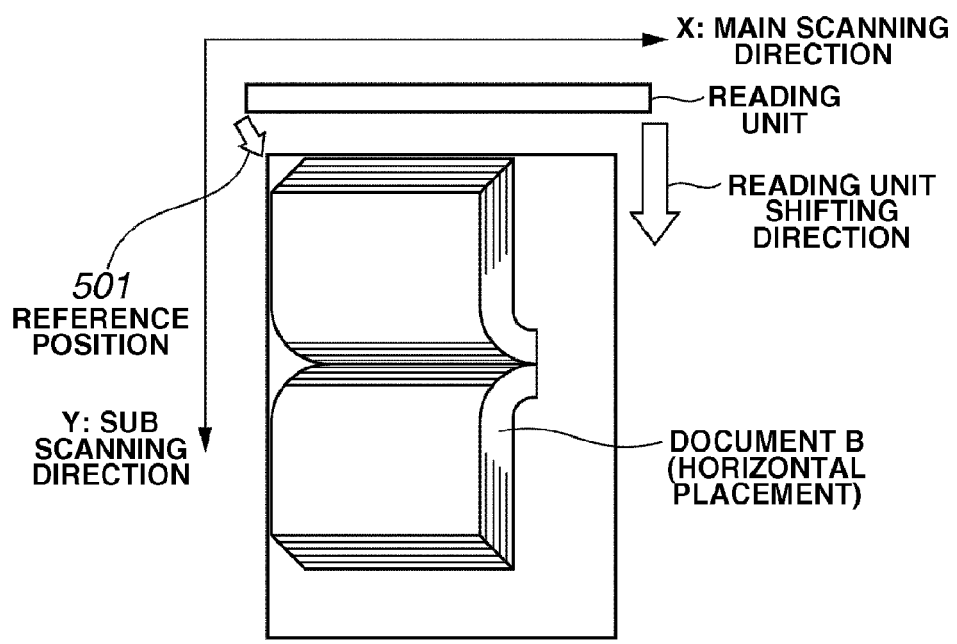

FIGS. 3A and 3B illustrate two placements of a book document placed on the platen 304 of the image reading apparatus 100. FIG. 3A illustrates a vertical placement of a book document having a binding portion and front edges extending in the sub scanning direction (i.e., a direction perpendicular to the main scanning direction), along which the reading optical unit including the line sensor can move.

When a book document facing downward in a spread state is placed on the platen 304, a shadow 403 appears along the border of right and left pages of the book if the binding portion of the book is in a floating state with a significant clearance from the platen. Shadows 402 and 404 appear along the right and left edges of the book because of the altitudinal clearance between each page edge and the platen.

FIG. 3B illustrates a horizontal placement of a book document whose binding portion and front edges extend in the main scanning direction (i.e., a direction along which the line sensor is disposed). FIGS. 3A and 3B are illustrations of an image seen from the reading sensor via the platen 304 illustrated in FIG. 2, i.e., from the inside of the apparatus body. In FIGS. 3A and 3B, reference positions 401 and 501 indicate the position of the reference mark 306 illustrated in FIG. 2.

Figure 4:
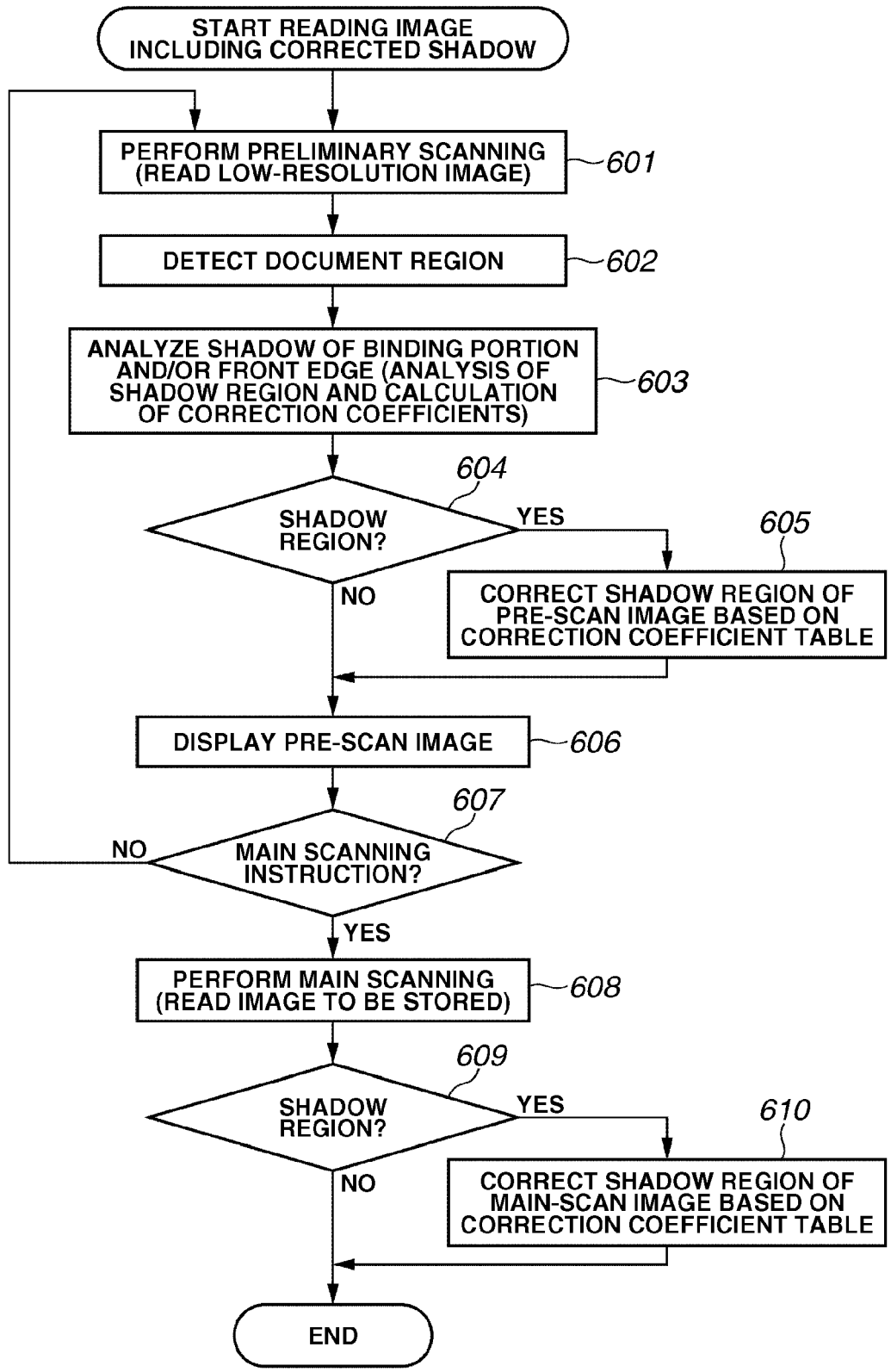
FIG. 4 is a flowchart illustrating an example of image processing according to the first exemplary embodiment of the present invention.

FIG. 4 is a flowchart illustrating an exemplary operation that obtains a corrected image of a book document including a binding portion and front edges corrected in luminance of the shadow according to an exemplary embodiment of the present invention. The PC 150 includes a storage apparatus (not illustrated) that stores a program of the following steps for obtaining a corrected image of the shadow of the binding portion.

First, in step 601, the PC 150 transmits a command to the image reading apparatus 100. In response to the command, the image reading apparatus 100 reads a low-resolution image of the entire surface on the platen. The PC 150 receives the low-resolution image read by image reading apparatus 100. The received image is a preliminary scan image (hereinafter, referred to as a "pre-scan image"), based on which the PC 150 can detect a document region on the platen and analyze the shadow of a binding portion and/or a front edge.

In step 602, the PC 150 analyzes the pre-scan image to identify a document region on the platen. Although not described in detail, the PC 150 can use any appropriate method for identifying a document region.

Next, in step 603, the PC 150 detects the shadow of a binding portion and/or a front edge within the document region detected in step 602 and calculates shadow correction coefficients (i.e., a shadow luminance correction coefficient table). Detailed processing for detecting a shadow region and calculating shadow correction coefficients will be described later.

In step 604, the PC 150 determines whether the shadow of a binding portion and/or a front edge has been detected based on the analysis of step 603. If the PC 150 determines that there is any shadow of a binding portion and/or a front edge (i.e., when there is any object to be subjected to a luminance correction), the processing flow proceeds to step 605. If the shadow of a binding portion and/or a front edge is not present, the processing flow proceeds to step 606.

In step 605, the PC 150 corrects the luminance of a shadow region in the pre-scan image based on the shadow luminance correction coefficient table obtained in step 603.

In step 606, the display 151 of the PC 150 displays the pre-scan image including a corrected shadow of the binding portion or the front edge.

In step 607, a user determines whether correction effects of the pre-scan image displayed on the display 151 are acceptable. If the pre-scan image is acceptable, the PC 150 transmits a reading command to the image reading apparatus 100 and the processing flow proceeds to step 608. The reading command includes reading conditions (e.g., resolution, target document region, etc).

In step 608, the image reading apparatus 100 reads a document image according to designated reading conditions and transmits the read image to the PC 150. The read image is referred to as a "main-scan image" which is an object to be stored.

In step 609, the PC 150 determines whether the shadow of a binding portion and/or a front edge requires correction based on the analysis result of the pre-scan image. If a shadow luminance correction is required, the processing flow proceeds to step 610.

In step 610, the PC 150 converts the resolution of the shadow correction coefficient table obtained from the analysis on the pre-scan image and applies the converted table data to shadow regions of a binding portion and/or a front edge of the main-scan image to obtain a target image including corrected shadow regions.

Figure 11:
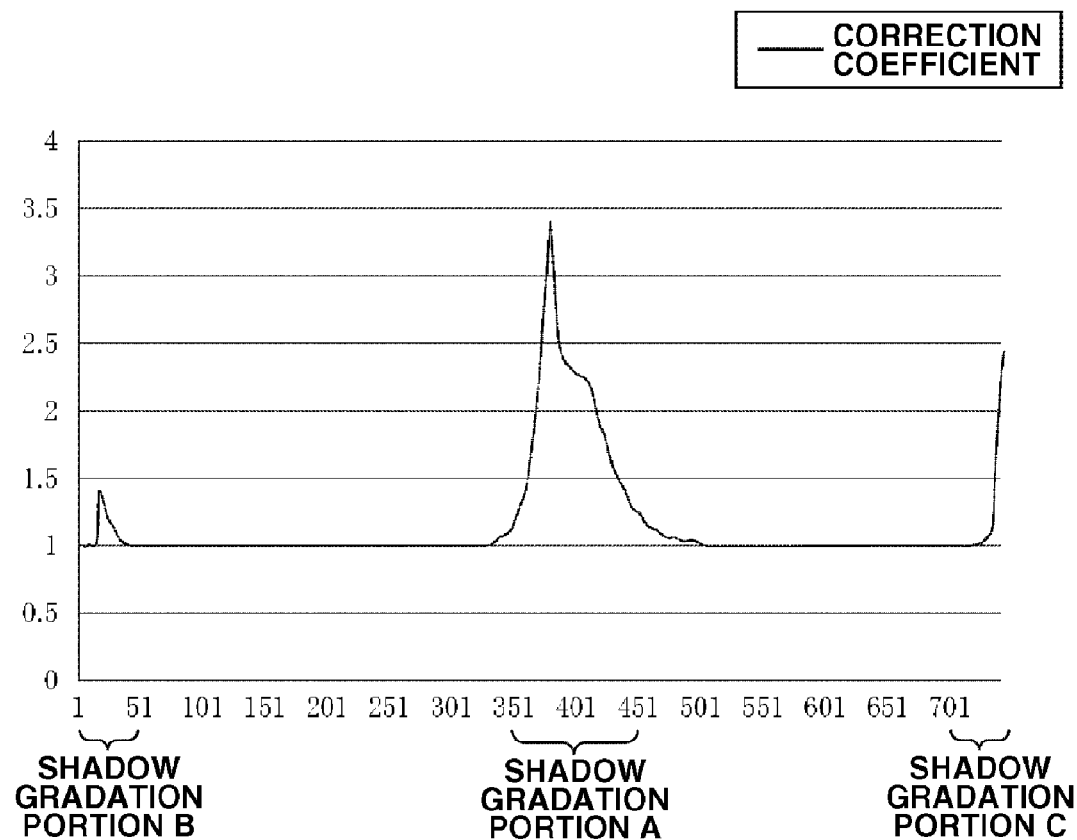
FIG. 11 is a graph illustrating an example of a shadow luminance correction coefficient table.

FIG. 11 illustrates an example of the shadow correction coefficient table (luminance correction magnification table) obtained from the analysis based on the pre-scan image. The exemplary correction coefficients of FIG. 11 are applicable to the book document illustrated in FIG. 3B.

In the graph, an abscissa axis represents a sub scanning pixel position of a pre-scan image having a resolution of 75 dpi, and an ordinate axis represents a correction coefficient at each pixel position. For example, the shadow of a binding portion is positioned in a range from the 350th pixel to the 450th pixel. The intensity of luminance correction applied to the binding portion is approximately 3.3 times the correction intensity applied to a bright region. Thus, the shadow correction coefficient table can increase the brightness of a binding portion in a concentrated manner. The correction based on the coefficient table is applied to any pixel (that may be a background pixel or a character pixel) positioned at an identified pixel position.

In the correction of a main-scan image which has a higher resolution compared to the pre-scan image, it is useful to perform the shadow luminance correction based on linearly interpolated correction coefficients obtained from the correction coefficient table.

Next, detailed processing of step 603 (i.e., the processing for detecting the shadow of a binding portion and/or a front edge and calculating shadow correction coefficients) is described below with reference to a flowchart of FIG. 5, based on an image of a document illustrated in FIG. 3B.

Figure 5:
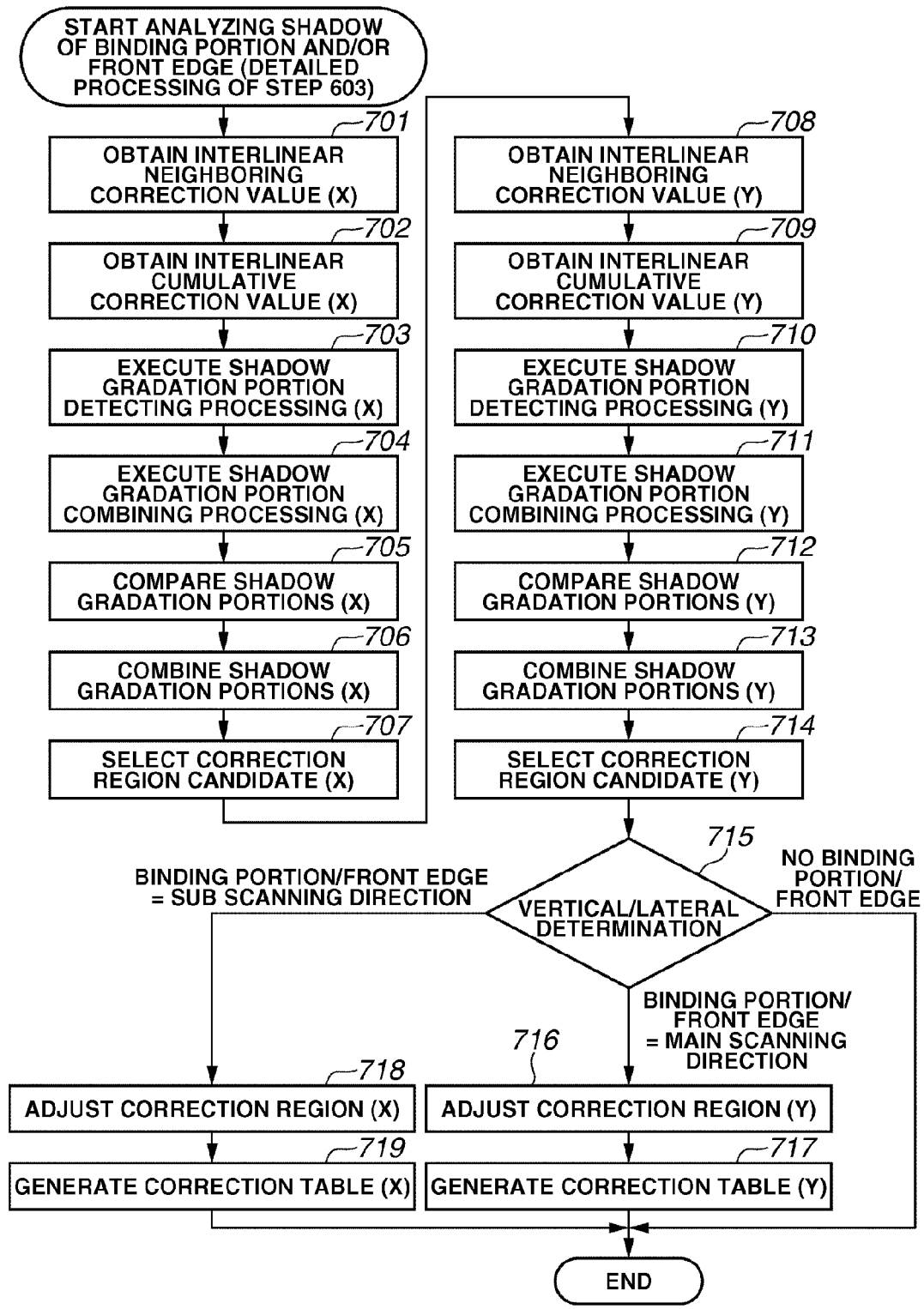
FIG. 5 is a flowchart illustrating details of image analyzing processing according to the first exemplary embodiment of the present invention.

FIG. 5 is a flowchart illustrating exemplary processing for analyzing the shadow of a binding portion and/or a front edge. In step 701, the PC 150 obtains interlinear neighboring correction values in the main scanning direction (as described later with reference to FIG. 6). In this case, an image includes vertical lines that extend in the sub scanning direction and are successively aligned in the main scanning direction.

The PC 150 obtains a correction value $cr(i)$ that minimizes a luminance difference between an average luminance of background pixels when each pixel on a target line is corrected brighter or darker and an average luminance of background pixels on a neighboring line positioned at the right side.

Namely, the correction value $cr(i)$ is a value c that minimizes a value $Dr(i)$ which is an integrated value relating to j and defined by the following formula.

$$Dr(i) = \Sigma abs(P(i,j) - P(i+1,j) \times (256+c)/256) \qquad (1)$$

where $P(i, j)$ is binary 8-bit data representing a luminance value of a pixel positioned at the i-th pixel position in the main scanning direction and at the j-th pixel position in the sub scanning direction, and abs( ) represents an absolute value function. If the target line P(i,*) is dark, the correction value becomes a positive value. If the target line P(i,*) is bright, the correction value becomes a negative value.

Figure 6:
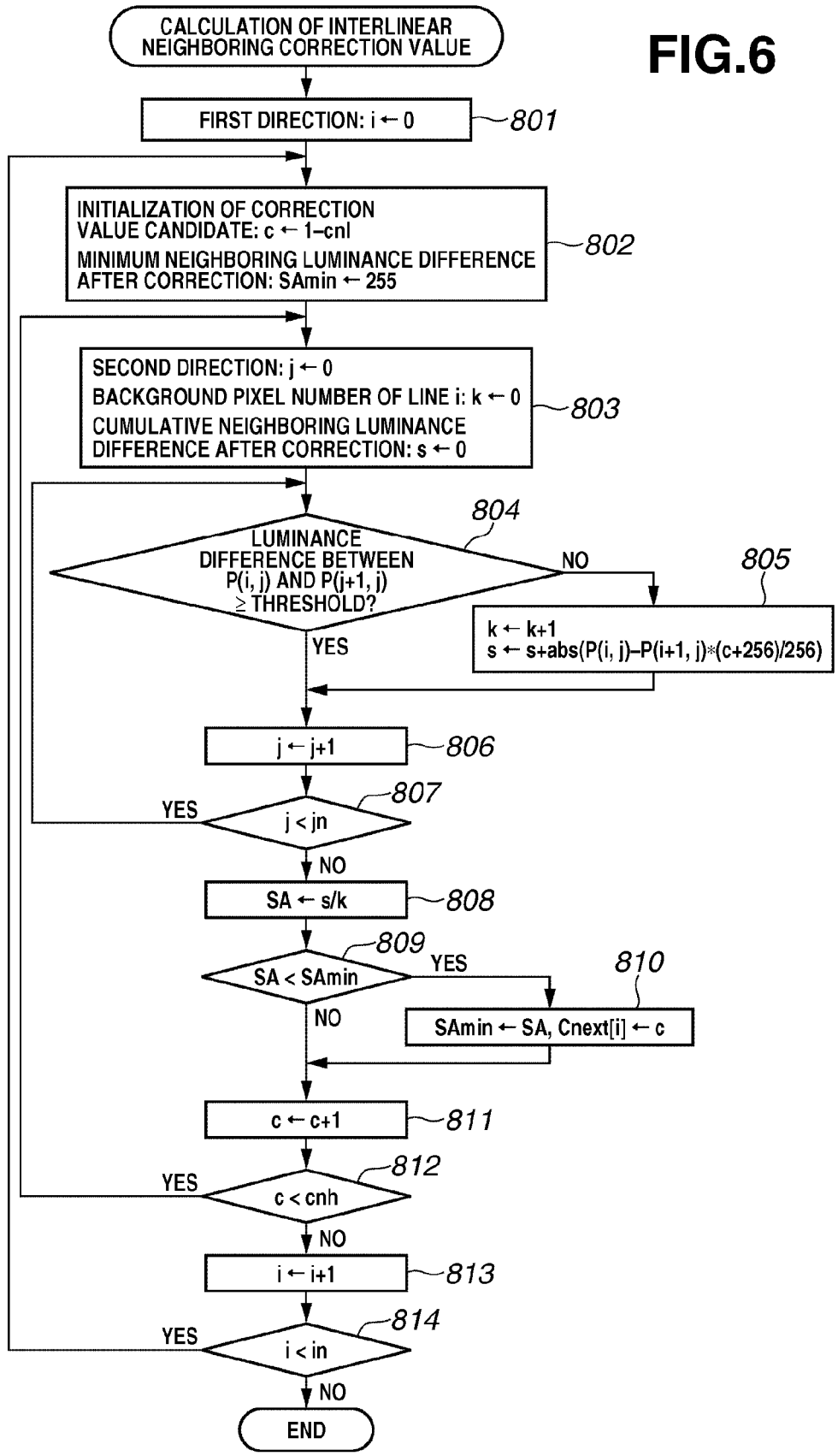
FIG. 6 is a flowchart illustrating shadow luminance feature calculating processing in the image analysis according to the first exemplary embodiment of the present invention.

The processing of step 701 is described below in more detail with reference to a flowchart of FIG. 6. In FIG. 6, "i" is a variable indicting the pixel position in a first direction, and "j" is a variable indicating the pixel position in a second direction. The first direction is identical to the X direction (i.e., the main scanning direction) in steps 701 to 707 of FIG. 5, and is identical to the Y direction (i.e., the sub scanning direction) in steps 708 to 714 of FIG. 5. The processing of the flowchart includes calculating a neighboring correction value Cnext[i] that represents a luminance change in the first direction caused by a binding portion extending in the second direction.

The PC 150 calculates the neighboring correction value Cnext[i] for each pixel position i in the first direction through the processing of steps 801, 813, and 814.

In step 802, to calculate a neighboring correction value of the pixel position i, the PC 150 sets a minimum value (1−cnl) as an initial value of the neighboring correction value candidate c. Furthermore, the PC 150 sets a sufficiently large value for a variable SAmin that represents a minimum luminance difference between two neighboring pixels having been obtained from the preliminary luminance correction calculation based on the candidate c. Next, the PC 150 obtains an average value of preliminary luminance correction results of background pixels on the line corresponding to the pixel position i based on the correction value candidate c.

In step 803, the PC 150 initializes calculation in the second direction j.

In step 804, the PC 150 determines whether a luminance difference between a target pixel P(i, j) and a neighboring pixel P(i+1, j) is equal to or greater than a predetermined threshold. If the luminance difference is equal to or greater than the threshold, the PC 150 determines that the target pixel is a contour pixel of a character or a line and determines that the target pixel is not an object to be subjected to a correction effect calculation.

The threshold for determining whether the target pixel is a contour pixel or a background pixel is, for example, 25 in luminance difference. However, the threshold varies depending on optical characteristics of an image reading apparatus or reduction processing to a pre-scan image. It is, therefore, useful to experimentally determine a value effective to each image reading apparatus that may output a document image including the shadow of a binding portion and/or a front edge.

If the luminance difference is less than the threshold, the PC 150 determines that the target pixel is a background pixel. The processing flow proceeds to step 805.

In step 805, the PC 150 increments a background pixel number k by adding 1. The background pixel number k represents the number of background pixels on the line corresponding to the pixel position i. Furthermore, the PC 150 calculates a difference between a luminance value P(i,j) of the target pixel and a luminance value P(i+1,j)×(256+c)/256. The luminance value P(i+1,j)×(256+c)/256 is a luminance value obtained by preliminarily correcting a luminance value P(i+1,j) of a neighboring pixel positioned next to the target pixel with a correction value candidate c. The PC 150 adds an absolute value of the calculated difference to a neighboring luminance difference cumulative variable "s."

In steps 806 and 807, the PC 150 repeats the above-described processing of steps 804 and 805 for all values of j.

Then in step 808, the PC 150 calculates an average value SA of the neighboring luminance difference obtained from the correction value candidate c.

In step 809, the PC 150 determines whether the calculated average value SA is less than a minimum value SAmin of a neighboring luminance difference average having been currently obtained. If the average value SA is less than the minimum value SAmin, the processing flow proceeds to step 810.

In step 810, the PC 150 stores the average value SA and the correction value candidate c as an optimum correction value candidate.

The PC 150 repeats the above-described processing of steps 803 through 810 until the correction value candidate reaches a maximum value (cnh−1) and obtains the neighboring correction value Cnext[i] of the pixel position i.

The values cnl and cnh to be referred to in steps 802 and 812 are values that determine a range of the neighboring correction value candidate c. These values can be experimentally obtained from the results of the processing applied to plural images including a binding portion.

More specifically, when cnl is 128 and cnh is 256, an optimum neighboring correction value can be selected from an area where the luminance of a neighboring line becomes approximately ½ or 2 times. If the resolution of a pre-scan image (i.e., an image used for detection and analyzes of a shadow) is high, the absolute values of cnl and cnh can be small values because the density change between neighboring lines is small. Namely, to obtain an optimized result for each read image, it is useful to switch the values of cnl and cnh depending on the resolution of a pre-scan image.

The neighboring correction value cr(i) corresponding to the pixel position i is a correction value for correcting a luminance value of a neighboring pixel positioned at the right side of the target pixel position to a luminance value of the target pixel.

Similarly, the PC 150 obtains a correction value cl(i) that corrects a luminance value of a neighboring pixel positioned at the left side of the target pixel position to a luminance value of the target pixel. Namely, cl(i) is a value c that minimizes a value Dl(i) which is an integrated value relating to j and defined by the following formula.

$$Dl(i)=\Sigma abs(P(i,j)-P(i-1,j)\times(256+c)/256) \qquad (2)$$

Figure 8A:
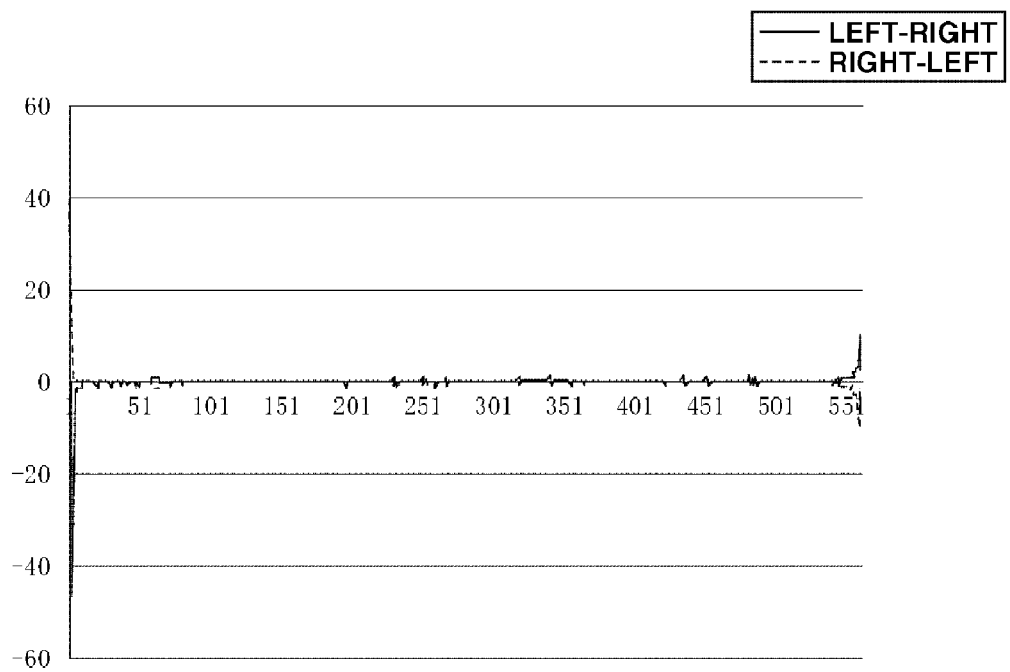
FIG. 8A is a graph illustrating exemplary interlinear neighboring correction values in the main scanning direction.
Figure 8B:
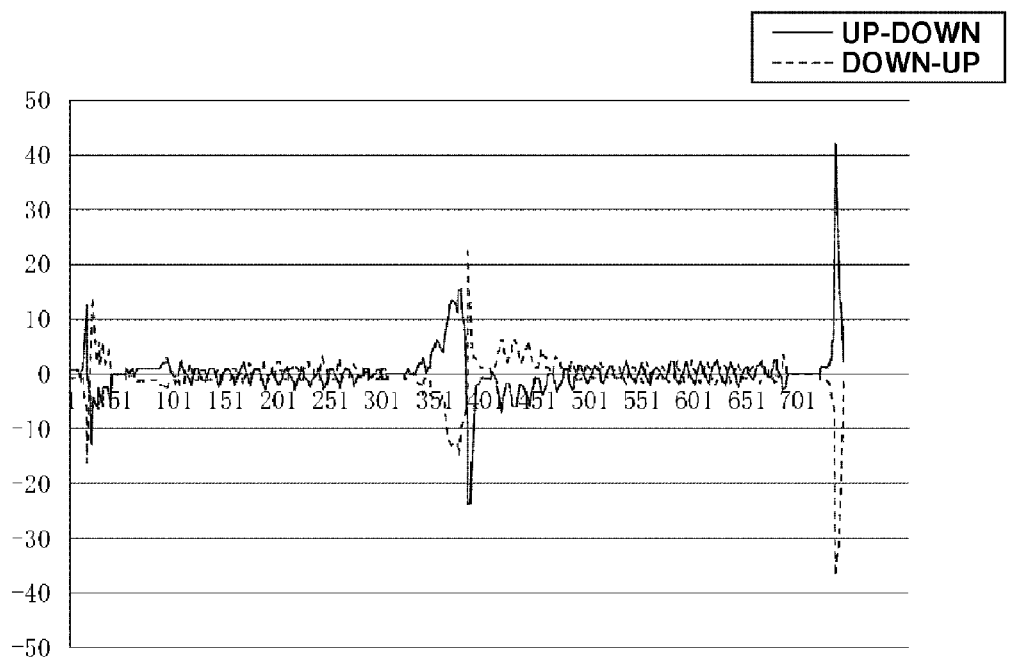
FIG. 8B is a graph illustrating exemplary interlinear neighboring correction values in the sub scanning direction.

FIG. 8A is a graph illustrating an example of the result obtained in step 701, wherein an abscissa axis represents the pixel position i in the main scanning direction, a bold line represents the correction value cr(i), and a thin broken line represents the correction value cl(i).

Next, in step 702, the PC 150 obtains interlinear neighboring correction magnifications ar(i) and al(i) from the neighboring correction values cr(i) and cl(i).

Furthermore, the PC 150 obtains interlinear cumulative correction magnifications sr(i) and sl(i) which are cumulative luminance correction values obtained by successively integrating the neighboring correction magnifications of line positions where the signs of correction values of the neighboring lines are same, until the signs of the correction values change. N represents a total number of lines.

With respect to the neighboring correction magnification (left→right): i=0, 1, 2, . . . , N−1, $$ar(i)=(256+cr(i))/256 \qquad (3)$$

With respect to the neighboring correction magnification (right→left): i=N−1, N−2, . . . , 2, 1, 0, $$al(i)=(256+cl(i))/256 \qquad (4)$$

With respect to the cumulative correction magnification (left→right): i=1, 2, 3, . . . , N−1, if$((cr(i-1)\times cr(i))\leq 0)$, then $sr(i)=ar(i)$ else $sr(i)=sr(i-1)\times ar(i) \qquad (5)$ With respect to the cumulative correction magnification (right→left): i=N−2, N−3, . . . , 2, 1, 0, $$if((cl(i+1) \times cl(i)) \leq 0),$$

$$then\ sl(i)=al(i)$$

$$else\ sl(i)=sl(i+1) \times al(i) \qquad (6)$$

Figure 9A:
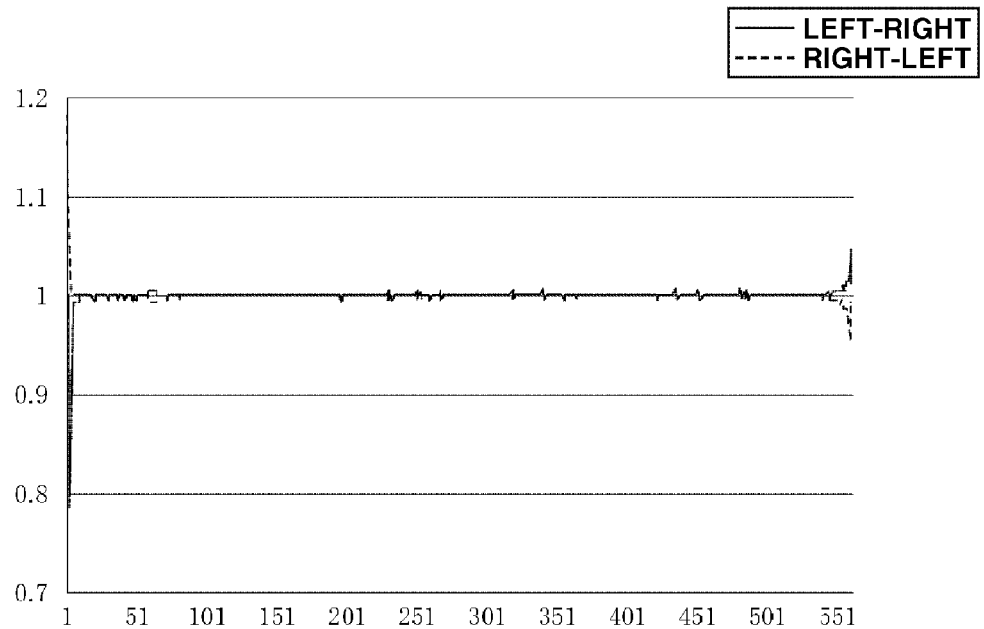
FIG. 9A is a graph illustrating exemplary interlinear neighboring correction magnifications in the main scanning direction.
Figure 9B:
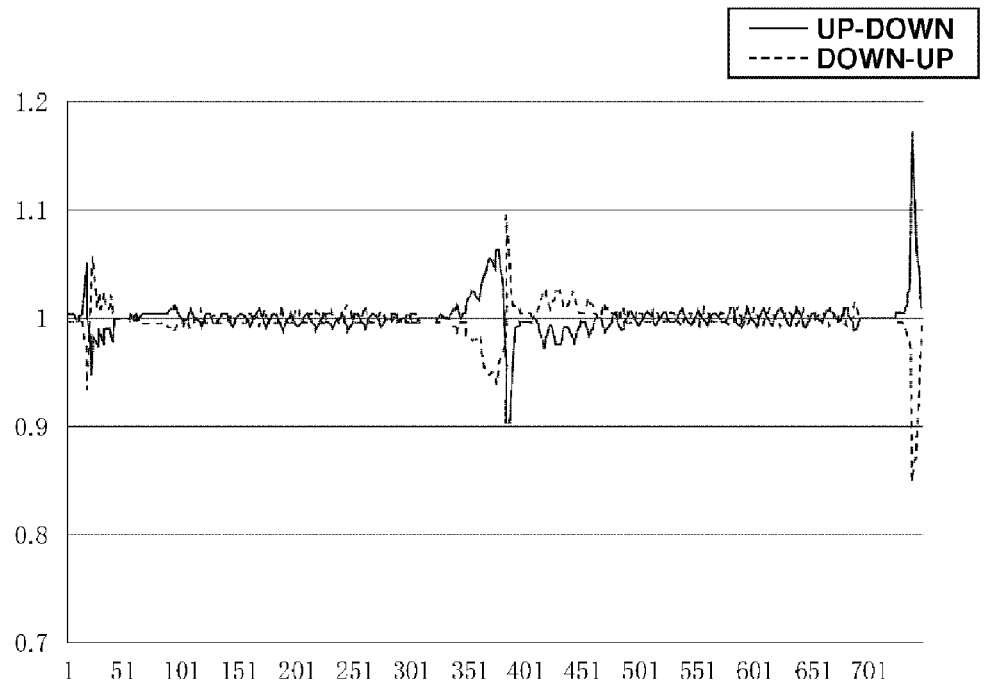
FIG. 9B is a graph illustrating exemplary interlinear neighboring correction magnifications in the sub scanning direction.

FIG. 9A illustrates exemplary neighboring correction magnifications obtained from the neighboring correction values of FIG. 8A. FIG. 11A illustrates exemplary cumulative correction magnifications obtained from the neighboring correction values of FIG. 8A.

In step 703, the PC 150 detects a candidate of the shadow in a binding portion or the shadow in a front edge, with reference to the cumulative correction magnifications. The PC 150 detects a portion where an extreme value in the cumulative correction magnification is equal to or greater than a predetermined threshold, and determines an area including portions continuously exceeding the threshold as a candidate of the shadow gradation portion (hereinafter, referred to as a "shadow gradation portion candidate". The threshold is set to a value, e.g., 1.2, which can avoid any erroneous detection caused by the unevenness (light and shade) of a paper surface.

However, due to the effect of a character having a dull contour, the cumulative correction magnification may include a local error in addition to a gradation change caused by the shadow. Therefore, the shadow gradation portion candidate may be split into two.

In step 704, the PC 150 regards two shadow gradation portion candidates as a single candidate if the gap of two shadow gradation portion candidates is equal to or less than a predetermined value, and if an updated/calculated extreme value in the cumulative correction magnification of continuous portions is greater than individual extreme values.

For example, the PC 150 regards two neighboring shadow gradation portion candidates as being continuous if the gap between two candidates is equal to or less than 6 in an image of 75 dpi. However, the determination gap in step 704 depends on the image resolution and each reading optical system. Furthermore, the PC 150 re-calculates the cumulative correction magnification.

If two shadow gradation portion candidates include a portion where the cumulative correction magnification is less than 1, the PC 150 does not execute the above-described processing.

The cumulative correction magnification calculated in the rightward direction and the cumulative correction magnification calculated in the leftward direction are independent from each other. The shadow of a binding portion includes two (right and left) shadow gradation portion candidates that adjoin along the center line of the binding portion.

In step 705, if two or more shadow gradation portion candidates are detected, the PC 150 determines the order of plural candidates based on their priorities. For example, the PC 150 can determine the order of the candidates with reference to the analysis of a distribution of the cumulative correction magnifications.

First, as illustrated in FIG. 12, the PC 150 compares two candidates P and Q of the shadow gradation portion (e.g., counts the number of lines) in each threshold slot of the cumulative correction magnification which has a constant width (e.g., 0.2 according to the example illustrated in FIG. 12).

In the following description, one threshold slot illustrated in FIG. 12 is referred to as a "cell." For example, the shadow gradation portion candidate P is a shadow whose luminance decreases moderately and is similar to a shadow gradation portion candidate Y2 illustrated in FIG. 10B. The distribution of the candidate P includes three lines in the leftmost cell (i.e., a cell of 1.0-1.2), one line in a cell of 1.2-1.4, and two lines in a cell of 1.4-1.6.

The shadow gradation portion candidate Q has a distribution of cumulative correction magnifications which corresponds to a change in the gradation caused by any factor other than the shadow. The distribution of the candidate Q includes four lines in the leftmost cell (i.e., a cell of 1.0-1.2), no lines in consecutive two cells of 1.2-1.4 and 1.4-1.6 (due to stepwise steep change), and three lines in a cell of 1.6-1.8. A cell of 1.8-2.0 has a maximum cumulative correction magnification.

As apparent from the foregoing description, the PC 150 obtains a comparison table by successively counting the number of lines in each threshold slot of the cumulative correction magnification. The PC 150 can identify the features of each candidate based on numerical values of respective cells in the following manner.

More specifically, numerical values in respective cells in the table can reflect features of a shadow having a decreased luminance to be corrected.

(1) A dark shadow causes large cumulative correction magnifications. Thus, the table includes a wider range distribution of numerical values (numerical values distributed from right to left cells).

(2) The shadow of a document in a floating state with a significant clearance from a platen has cumulative correction magnifications that change moderately. The rightmost and other right cells tend to be not vacant.

(3) Even if the maximum cumulative correction magnifications are the same, a shadow having a wider width causes changes at many lines (because of many threshold slots) compared to a narrow shadow. The numerical value in each cell tends to become larger.

Accordingly, if a shadow gradation portion candidate has many cells having large values, this candidate is an object to be subjected to the luminance correction.

As described above, the numerical values in respective cells represent features of the shadow gradation portion candidate. Therefore, in the comparison of two shadow gradation portion candidates, the PC 150 can determine that a shadow gradation portion candidate having large numerical values in many cells has a higher priority compared to the other candidate.

More specifically, an underline is put to a larger one of compared numerical values in each cell of FIG. 12. The candidate P includes six cells having underlined numerical values and the candidate Q includes two cells having underlined numerical values. Thus, the PC 150 determines that the candidate P has a higher priority compared to the candidate Q.

Furthermore, the PC 150 stores a validity feature quantity that represents the total number of cells having larger values. Namely, the PC 150 stores "6" for the candidate P and "2" for the candidate Q. The PC 150 performs the above-described two-item comparison for all shadow gradation portion candidates, and determines the order of shadow gradation portion candidates with reference to the number of determined priorities and the validity feature quantity.

More specifically, the PC 150 determines the order of the candidates based on a second validity feature quantity which is equal to the sum of validity feature quantities added with 100 times the number of determined priorities.

After completing the processing of step 705, i.e., in step 706, the PC 150 selects a shadow gradation portion candidate corresponding to the shadow of a binding portion and/or a front edge which is an object to be subjected to the luminance correction. The PC 150 can perform this selection based on the fact that a total number of shadow regions does not exceed 4 (corresponding to two parts of a binding portion and two front edges) and the luminance reducing direction of each shadow region is limited.

As described above, the method according to an embodiment is capable of detecting a gradation direction of the shadow. Therefore, the analysis processing recognizes right and left shadow regions of a binding portion as different regions. More specifically, in the example illustrated in FIG. 3A, the shadow region 403 of the binding portion includes a left-hand shadow region 405 and a right-hand shadow region 406 which can be discriminated as different regions. Each of a right-hand front edge region 402 and a left-hand front edge region 404 is recognized as a single region.

In other words, the shadow gradation portion candidates are present in any one of the following four regions illustrated in FIG. 3A:

a left-hand front edge region 404 (having a lower luminance value at the left side);

a left-hand shadow region 405 of the binding portion (having a lower luminance value at the right side);

a right-hand shadow region 406 of the binding portion (having a lower luminance value at the left side); and a right-hand front edge region 402 (having a lower luminance value at the right side).

Accordingly, the PC 150 can designate shadow luminance correction regions as a combination of the above-described four regions (i.e., all of the four shadow gradation regions) or a subset of the regions (i.e., three or less selected from the four shadow gradation regions).

The shadow of the binding portion is composed of a pair of regions (i.e., a left-hand region and a right-hand region). For example, if an obtained combination is composed of a region having a lower luminance value at the left side and a region having a lower luminance value at the left side, the PC 150 can exclude this combination. The PC 150 prepares a list including all combinations of the shadow gradation portion candidates that satisfy the conditions.

Next, the PC 150 obtains an overall feature quantity of combined shadow gradation portion candidates based on an addition of second validity feature quantities (calculated for respective shadow gradation portion candidates according to the two-item comparison priority determination method in step 705) with respect to gradation portion candidates involved in a combination of shadow gradation portion candidates.

The PC 150 calculates the overall feature quantity for each combination involved in the list generated in step 706, and designates a combination of shadow gradation portion candidates which maximizes the overall feature quantity as shadow correction candidate regions in the main scanning direction.

The PC 150 executes the succeeding processing of steps 708 through 714 (which is similar to the above-described steps 701 through 707), to detect shadow correction candidate regions in the sub scanning direction. In this manner, the PC 150 can select four (at maximum) shadow gradation portion candidates in each of the main scanning direction and the sub scanning direction.

Figure 10A:
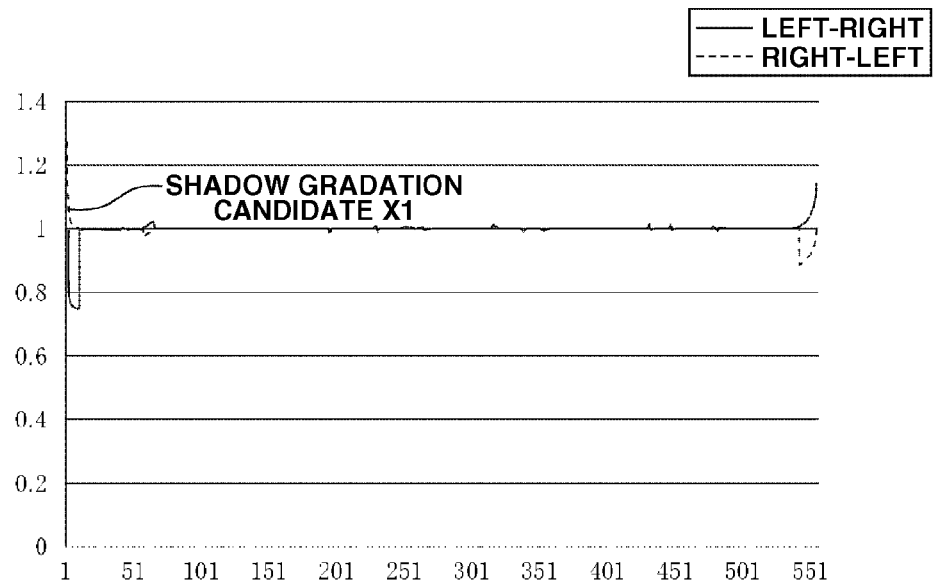
FIG. 10A is a graph illustrating exemplary interlinear cumulative correction magnifications in the main scanning direction.
Figure 10B:
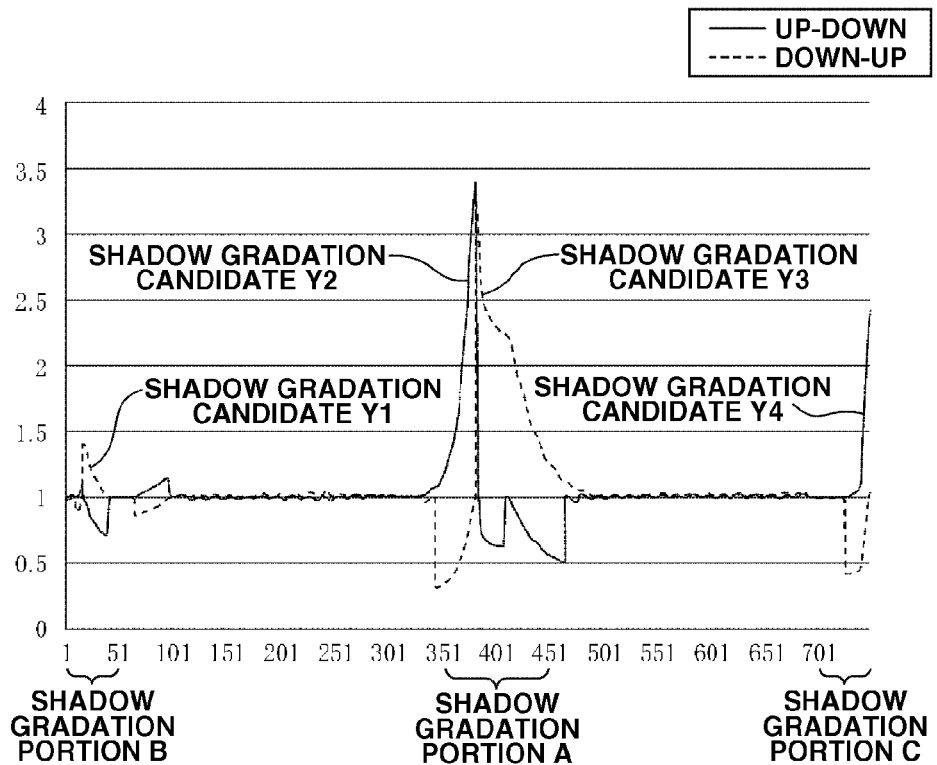
FIG. 10B is a graph illustrating exemplary interlinear cumulative correction magnifications in the sub scanning direction.

According to the examples illustrated in FIGS. 11A and 10B, the PC 150 selects a shadow gradation portion candidate X1 in the main scanning direction and shadow gradation portion candidates Y1, Y2, Y3, and Y4 in the sub scanning direction. Namely, the candidates selected in both directions totals 5.

In step 715, the PC 150 performs the two-item comparison for all combinations of the shadow gradation portion candidates (i.e., five candidates) according to a procedure similar to the method used in step 705.

The PC 150 determines the order of the shadow gradation portion candidates based on the number in the priority determination having been obtained in this manner. If a correction value and a correction area of a shadow gradation portion candidate having the highest priority are less than predetermined thresholds, the PC 150 determines that there is no binding portion.

For example, if the maximum correction value is less than 1.5 times and the correction area has a width less than 5 mm on a real image, the PC 150 determines that this shadow includes no binding portion. The threshold can be experimentally determined as a value that can eliminate any erroneous determination which may occur when a document image includes a frame or the like similar to a shadow.

Figure 13:
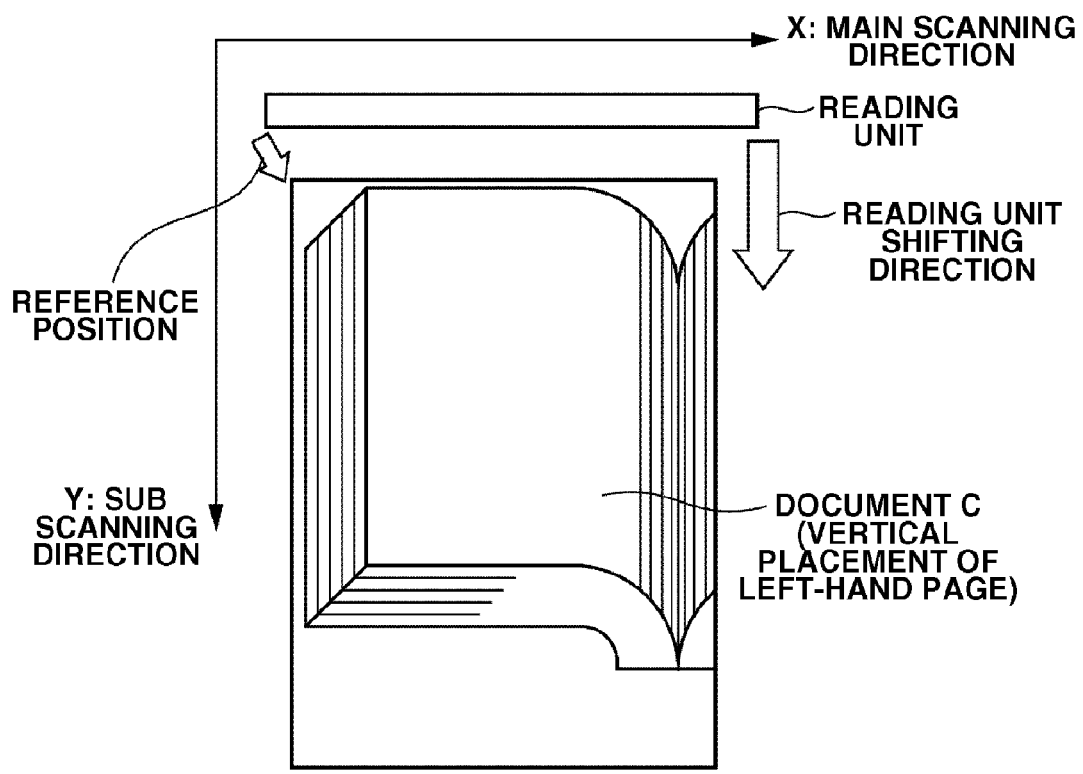
FIG. 13 illustrates an example of a book document placed on a platen to which the shadow luminance correction is applied according to an exemplary embodiment of the present invention.

Thus, the method of the present embodiment can be applied to a document image which may include only one front edge as illustrated in FIG. 13.

Furthermore, if the shadow gradation portion candidate having the highest priority is a shadow gradation portion candidate having been selected in step 707 (i.e., a candidate detected in the main scanning direction), the PC 150 determines that the binding portion and/or the front edge extends in the sub scanning direction as illustrated in FIG. 3A.

If the shadow gradation portion candidate having the highest priority is a shadow gradation portion candidate having been selected in step 714 (as a candidate detected in the sub scanning direction), the PC 150 determines that the binding portion and/or the front edge extends in the main scanning direction as illustrated in FIG. 3B.

According to the examples illustrated in FIGS. 11A and 10B, the PC 150 determines that the shadow gradation portion candidate Y3 has the highest priority and the binding portion and/or the front edge extends in the main scanning direction as illustrated in FIG. 3B. As a result, the PC 150 applies the processing of step 716 to the shadow gradation portion candidates Y1, Y2, Y3, and Y4 (i.e., candidates in the Y direction)

If it is determined that the binding portion and/or the front edge extends in the sub scanning direction, the PC 150 executes the processing of step 718. In step 718, the PC 150 performs adjustment processing relating to application of the cumulative correction magnification for the shadow gradation portion candidate selected in step 707 (i.e., the candidate detected in the main scanning direction).

More specifically, if a front edge candidate is spaced from the edge of an analyzed image by a predetermined distance (e.g., 20 mm or more on an actual image), the PC 150 determines that this candidate is a texture of a document other than a front edge and excludes this candidate from the shadow correction object. The PC 150 extracts the remaining candidates as shadow regions.

In step 719, the PC 150 generates a luminance correction table for each region of the shadow gradation portion candidate (i.e., a shadow luminance correction object).

If it is determined that the binding portion extends in the main scanning direction, the PC 150 executes the processing of steps 716 and 717 to generate a shadow luminance correction coefficient table in the same manner. According to the example illustrated in FIG. 10B, the binding portion and the front edges extend in the main scanning direction. More specifically, a pair of the shadow correction candidate Y2 and the shadow correction candidate Y3 in FIG. 10B constitutes a binding portion region.

The cumulative correction magnification in this region can be used as a luminance correction coefficient for correcting the shadow of the binding portion, and is equal to a correction coefficient for a shadow gradation portion A in FIG. 11.

The shadow gradation portion candidate Y1 corresponds to the shadow of the left-hand front edge and is equal to a correction coefficient for a shadow gradation portion B in FIG. 11. Similarly, the shadow gradation portion candidate Y4 corresponds to the shadow of the right-hand front edge and is equal to a correction coefficient for a shadow gradation portion C in FIG. 11.

The PC 150 performs the shadow luminance correction (i.e., processing of step 605) that corrects a shadow region in the pre-scan image based on the shadow luminance correction coefficient table having been generated as described above. Furthermore, the PC 150 performs the shadow luminance correction (i.e., processing of step 610) that corrects a shadow region in the main-scan image based on the shadow luminance correction coefficient table having been generated as described above. Thus, the PC 150 can correct the luminance of the shadow (i.e., dark portion) of a binding portion and/or a front edge in a floating state with a significant clearance from the platen.

Second Exemplary Embodiment

A second exemplary embodiment of the present invention is similar to the first exemplary embodiment in the arrangement including the image reading apparatus 100 and the PC 150 illustrated in FIG. 1. The PC 150 according to the second exemplary embodiment executes the processing for obtaining an image including luminance-corrected shadows of a binding portion and front edges of a book document, according to the flowchart of FIG. 5.

A calculation method according to an embodiment can obtain interlinear neighboring correction values in the analysis of a shadow of a binding portion.

FIG. 7 is a flowchart illustrating exemplary processing for calculating the interlinear neighboring correction value (image feature quantity) in the processing for analyzing the shadow of a binding portion and/or a front edge.

In FIG. 7, "i" is a variable indicting the pixel position in a first direction, and "j" is a variable indicating the pixel position in a second direction. The processing of the flowchart includes calculating a neighboring correction value Cnext[i] that represents a luminance change in the first direction caused by a binding portion extending in the second direction.

Therefore, in steps 901 through 910, the PC 150 determines whether a target pixel is a background pixel that can be used to detect a shadow luminance and stores the detected pixel on a two-dimensional map [i,j]. Then, in steps 911 through 924, the PC 150 calculates the neighboring correction value Cnext[i] based on the background pixel determination map[i,j].

Detailed contents of the processing will be described below with reference to the flowchart of FIG. 7. Through steps 901, 909, and 910, the PC 150 generates a background pixel determination map[i,j] for each pixel position i of the first direction and a background pixel number k[i] on the line corresponding to the pixel position i.

In step 902, the PC 150 initializes the calculation in the second direction (j=0). Furthermore, to count the number of background pixels at the pixel position i, the PC 150 sets the background pixel number k[i] to an initial value (=0).

In step 903, the PC 150 determines whether a luminance difference between a target pixel P(i,j) and a neighboring pixel P(i+1,j) is equal to or greater than a predetermined threshold (e.g., "25"). If the luminance difference is equal to or greater than the threshold, the processing flow proceeds to step 906. In step 906, the PC 150 determines that the target pixel is a contour pixel of a character or a line which is set as a non-background pixel on the map[i,j].

If the luminance difference is less than the threshold, the processing flow proceeds to step 904. In step 904, the PC 150 determines whether a color difference (i.e., chrominance) between the target pixel P(i,j) and the neighboring pixel P(i+1,j) is equal to or greater than a predetermined threshold (e.g., "20"). If the color difference is equal to or greater than the threshold, the processing flow proceeds to step 906. In step 906, the PC 150 determines that the target pixel is a contour pixel of a color character or a colored portion which is set as a non-background pixel on the map[i,j].

If both the luminance difference and the color difference are less than the thresholds, the processing flow proceeds to step 905. In step 905, the PC 150 determines that the target pixel P(i,j) is a background pixel which is set on the map[i,j]. Furthermore, the PC 150 increments the background pixel number k[i] by 1.

The PC 150 repeats the above-described processing for all values of j through steps 907 and 908, and generates a finalized background pixel determination map[i,j]. The determination of chrominance between two neighboring pixels in step 904 can be performed based on a maximum value of the absolute value in the difference of luminance values of RGB colors, or based on a larger one of a Cr-difference absolute value and a Cb-difference absolute value in a converted color space of YCrCb. The thresholds used in steps 903 and 904 can be appropriately determined from experimental data obtained from many documents.

The PC 150 calculates the neighboring correction value Cnext[i] for each pixel position i of the first direction through steps 911, 923, and 924.

In step 912, to calculate a neighboring correction value of pixel position i, the PC 150 sets a minimum value (1−cnl) as an initial value of the neighboring correction value candidate c. Furthermore, the PC 150 sets a sufficiently large value as a variable SAmin that represents a minimum luminance difference between two neighboring pixels having been obtained based on the candidate c. Next, the PC 150 obtains an average value of luminance correction results applied to background pixels on the line corresponding to the pixel position i based on the correction value candidate c.

In step 913, the PC 150 initializes the calculation in the second direction (j=0). In step 914, the PC 150 determines whether the target pixel P(i,j) is a background pixel with reference to the background pixel determination map[i,j]. If the target pixel P(i,j) is a background pixel, the processing flow proceeds to step 915.

In step 915, the PC 150 calculates a luminance difference. The PC 150 calculates a difference between a luminance value PN(i+1,j) of the target pixel and a luminance value PN(i+1,j)×(256+c)/256 which can be preliminary calculated by correcting a luminance value PN(i+1,j) of a neighboring pixel based on the correction value c, for each of RGB colors. N represents one of RGB colors. The PC 150 obtains an absolute value of the calculated difference for each of RGB colors, and adds a maximum value to a neighboring luminance difference cumulative variable "s."

After the above-described processing of steps 914 and 915 is repeated for all values of j through steps 916 and 917, the processing flow proceeds to step 918. In step 918, the PC 150 calculates an average value SA of the neighboring luminance difference obtained based on the correction value c.

In step 919, the PC 150 determines whether the calculated average value SA is less than the minimum value SAmin of the neighboring luminance difference average having been currently obtained.

If the average value SA is less than the minimum value SAmin, the processing flow proceeds to step 920. In step 920, the PC 150 stores the average value SA and the correction value candidate c as an optimum correction value candidate.

The PC 150 repeats the above-described processing of steps 913 through 920 until the correction value candidate reaches a maximum value (cnh−1) and obtains the neighboring correction value Cnext[i] of the pixel position i.

Similar to the first exemplary embodiment, the PC 150 compares the obtained neighboring correction value with right and left pixels in the main scanning direction and compares the obtained neighboring correction value with lower and upper pixels in the sub scanning direction. Then, the PC 150 corrects the shadow based on a finally obtained shadow luminance correction coefficient table.

To determine a background pixel and calculate the luminance difference, an embodiment detects a character/graphic pixel and calculates shadow correction coefficients based on chrominance information and luminance differences of respective colors. Thus, an embodiment can continuously and smoothly correct the shadow of a binding portion and/or a front edge of color characters or a color document.

Third Exemplary Embodiment

A third exemplary embodiment of the present invention is similar to the first exemplary embodiment in the arrangement including the image reading apparatus 100 and the PC 150 illustrated in FIG. 1. The PC 150 according to the third exemplary embodiment executes the processing for obtaining an image including luminance-corrected shadows of a binding portion and front edges of a book document, according to the flowchart of FIG. 5.

The present embodiment is applicable to a document image that includes top and bottom shadows of a book binding portion which are different in width, or an image of a slightly inclined book document that includes inclined shadows of a binding portion and front edges.

Figure 14:
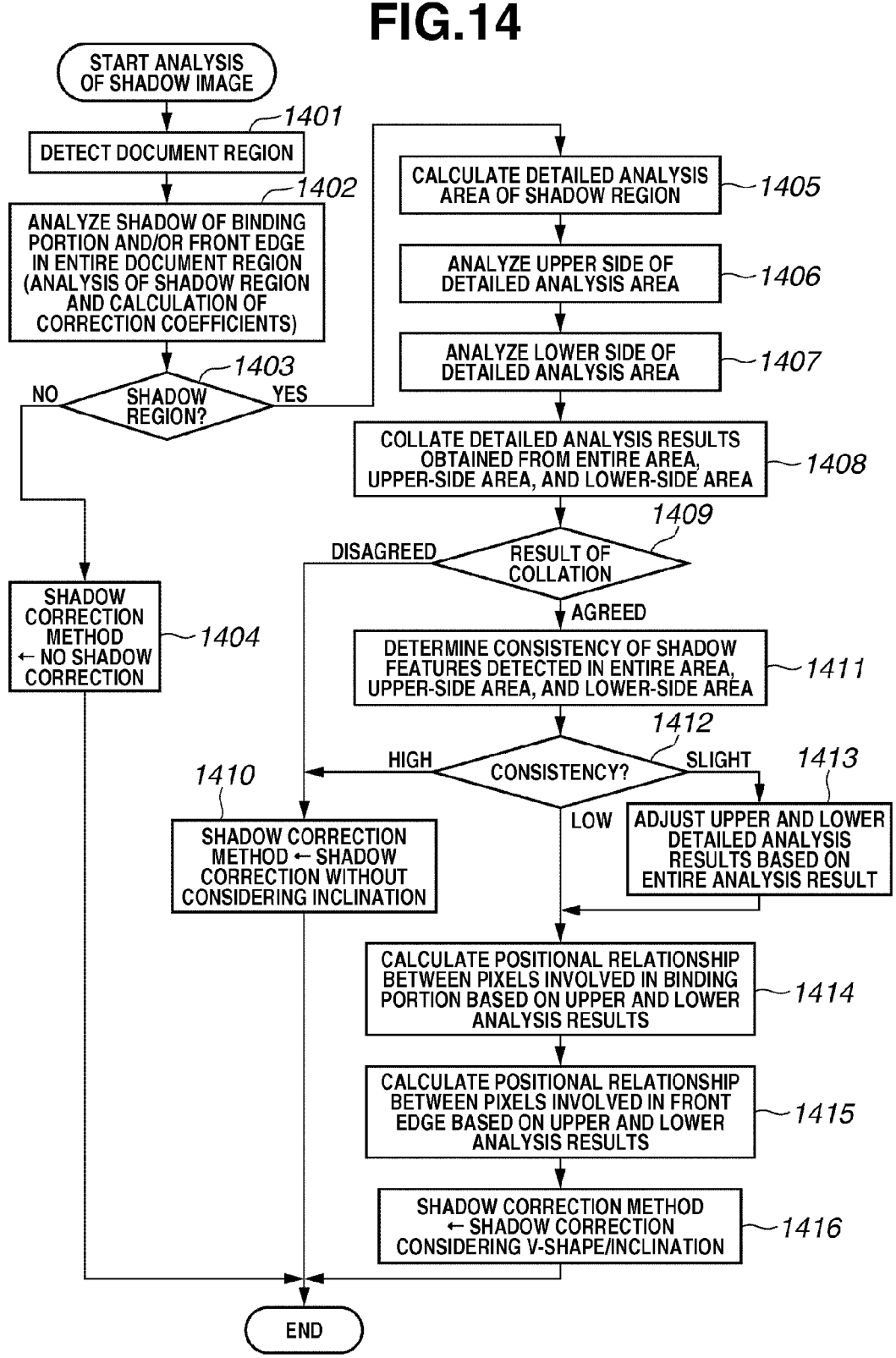
FIG. 14 is a flowchart illustrating exemplary shadow analysis processing applied to a book document having top and bottom binding portions different in the clearance from the platen.

FIG. 14 is a flowchart illustrating exemplary processing for analyzing a V-shaped shadow of a binding portion of a book document placed on a platen which may be caused when a pressing force is not uniformly applied on the book document. If a book document is not uniformly pressed, the floating (i.e., altitudinal) height from the platen at the top of the book document is different from the floating height at the bottom.

In step 1401, the PC 150 analyzes a pre-scan image and identifies a document region on the platen.

In step 1402, the PC 150 detects shadows of a binding portion and front edges and calculates shadow correction coefficients, within the document region detected in step 1401. The processing for detecting shadow regions in the entire document area and calculating the shadow correction coefficient table in step 1402 is similar to the processing described in the first exemplary embodiment or the second exemplary embodiment.

In step 1403, the PC 150 determines whether any shadow region of a binding portion and/or a front edge is detected based on the result of step 1402. If there is a shadow of a binding portion and/or a front edge to be corrected in luminance, the processing flow proceeds to step 1405.

In step 1405, the PC 150 limits the analysis area to a part of the detected shadow region in the pre-scan image. The PC 150 performs the processing for detecting a detailed shadow region and calculating a shadow correction coefficient table, and obtains detailed features of the shadow of a binding portion and/or a front edge. The calculation result in step 1402 can be referred to as entire analysis result. If there is no shadow of a binding portion and/or a front edge, the processing flow proceeds to step 1404. In step 1404, the PC 150 does not perform the shadow luminance correction processing.

Figure 15:
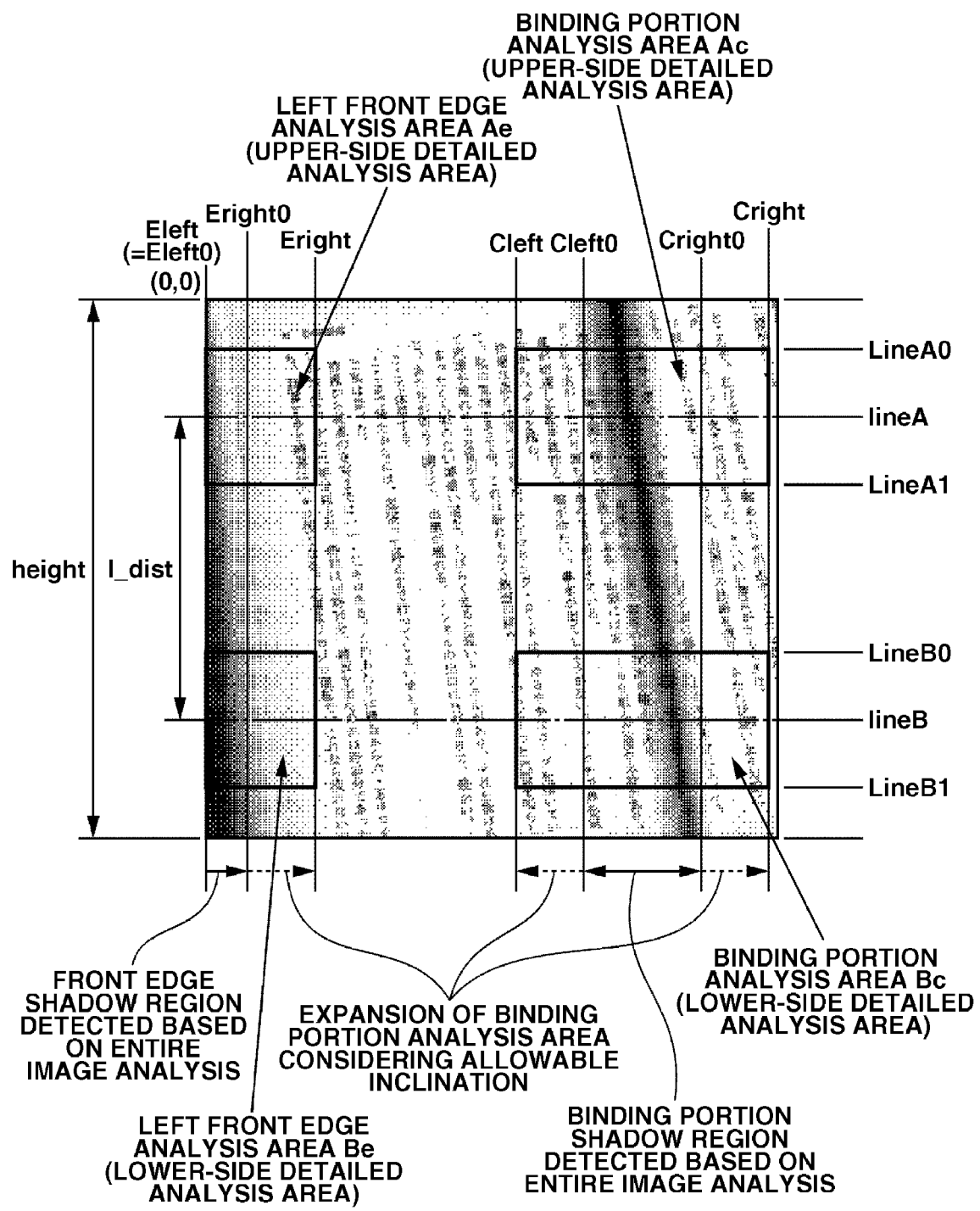
FIG. 15 illustrates detailed analysis areas on an inclined book document image.

The calculation of an area where detailed analysis processing is performed to obtain detailed features of the shadow of a binding portion and/or a front edge (i.e., the processing of step 1405) is described below in more detail with reference to FIG. 15. FIG. 15 illustrates exemplary analysis areas of a book document image inclined toward the left by an angle of approximately 10 degrees.

The image includes a shadow of a binding portion at the right side therefore wherein an upper-side shadow is wider and darker compared to a lower-side shadow. The image also includes a shadow of a front edge at the left side thereof. In FIG. 15, a pixel area ranging from Cleft0 to Cright0 includes a shadow of a binding portion detected in step 1402 (i.e., the analysis of the entire document area) and a pixel area ranging from Elect0 to Eright0 includes a shadow of a left-hand front edge detected in step 1402.

As described in the first exemplary embodiment, the entire document analysis (step S1402) calculates a shadow region of a vertical binding portion by averaging the luminance information in the vertical direction and obtains a correction table, without considering a V-shaped/inclined state.

The present embodiment analyzes shadows in detail in two (upper and lower) limited analysis areas of a binding portion or a front edge, and detects a V-shaped/inclined shadow region. The PC 150 calculates LineA0 and LineA1 that define a vertical range of an analysis area (Ac) positioned at the upper side of the binding portion and an analysis area (Ae) positioned at the upper side of the front edge, according to the following formulas.

$$Line A0 = height \times 0.1 \quad (10)$$

$$Line A1 = height \times 0.4 \quad (11)$$

Similarly, the PC 150 calculates LineB0 and LineB1 that define a vertical range of an analysis area (Bc) positioned at the lower side of the binding portion and an analysis area (Be) positioned at the lower side of the front edge, according to the following formulas.

$$Line B0 = height \times 0.6 \quad (12)$$

$$Line B1 = height \times 0.9 \quad (13)$$

The coordinate system of FIG. 15 has an origin (0,0) at the upper-left corner. The coordinate value of a pixel position becomes a lager value when the pixel position shifts rightward. The coordinate value of a line position becomes a larger value when the line position shifts downward.

The present embodiment sets LineA0 (defining an upper-side analysis area) and LineB1 (defining a lower-side analysis area) to line positions that are offset (spaced) from the top and the bottom of the analysis area by an amount equal to height× 0.1. This setting is useful to eliminate any effects in shadow density caused by stray light entering from the clearance between the binding portion and the platen.

Furthermore, the PC 150 calculates lineA and lineB that indicate the center coordinates of respective analysis areas in the vertical direction according to the following formulas.

$$line A = (Line A0 + Line A1)/2 = height \times 0.25 \quad (14)$$

$$line B = (Line B0 + Line B1)/2 = height \times 0.75 \quad (15)$$

The obtained lineA and lineB are reference lines in a luminance correction table that can be calculated from the upper and lower analysis areas. The numerical constants in the formulas (10) through (13) can be experimentally determined for each image reading apparatus that reads an image to be subjected to the shadow correction.

Next, the PC 150 calculates Cleft and Cright that define a lateral range of the analysis areas (Ac, Bc) positioned in the binding portion and Eleft and Eright that define a lateral range of the analysis areas (Ae, Be) positioned in the front edge, according to the following formulas.

$$Cleft = Cleft0 - ExtRange \tag{16}$$

$$Cright = Cright0 + ExtRange \tag{17}$$

$$Eleft = Eleft0 - ExtRange \tag{18}$$

$$Eright = Eright0 + ExtRange \tag{19}$$

In the formulas, ExtRange represents a numerical value calculated from the following formula based on a distance l_dist between lineA and lineB. ExtRange is an extension for enlarging the analysis area based on the entire analysis result considering an allowable V-shaped/inclined angle θ.

$$ExtRange = l\_dist \times \tan(\theta) \tag{20}$$

In the calculations of the formulas (16) through (19), the calculation result is regarded as "0" if the result has a negative value and replaced with (image width −1) if the result exceeds the image width.

The PC 150 analyzes shadows in respective partial analysis areas (Ac, Ae, Bc, and Be) calculated in step 1405 in the same manner as in the entire analysis.

In step 1406, the PC 150 simultaneously analyzes the upper-side analysis area (Ac) of the binding portion and the upper-side analysis area (Ae) of the front edge which have the same vertical range. As detailed analysis can detect the direction of a binding portion, the analysis is performed in only one direction.

More specifically, the PC 150 detects shadow regions in the lateral direction and calculates a luminance correction table according to the processing of steps 701-707, 718, and 719 in the flowchart of FIG. 5 (i.e., the processing for analyzing the luminance change in the lateral direction).

In step 1407, the PC 150 analyzes the lower-side analysis area (Bc) of the binding portion and the lower-side analysis area (Be) of the front edge, in the same manner.

Figure 16A:
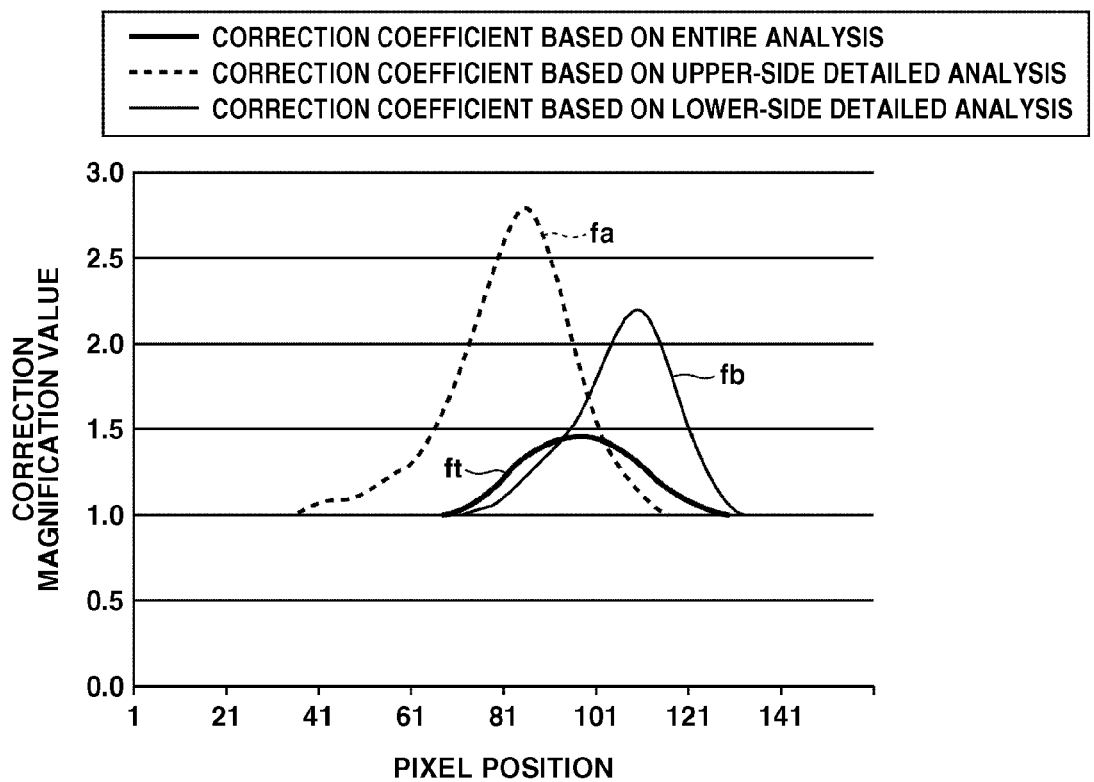
FIGS. 16A and 16B are graphs illustrating an exemplary combination of shadow luminance correction coefficients obtained by a partial image analysis and shadow luminance correction coefficients obtained by an entire image analysis.

FIG. 16A illustrates a luminance correction magnification table calculated from the analysis areas (Ac and Bc) of the binding portion. In FIG. 16A, a dotted line fa represents the result obtained from the upper-side analysis area (Ac) of the binding portion, a thin line fb represents the result obtained from the lower-side analysis area (Bc) of the binding portion, and a bold line ft represents the entire analysis result.

In step 1408, the PC 150 performs processing for collating the entire analysis result with the upper and lower detailed analysis results. For example, if the shadow region is inclined at an edge of an image, an upper portion or a lower portion of the binding portion may not be involved in the image and may not be detected as part of the binding portion. In such a case, to obtain a better shadow correction image, it is useful to perform the correction based on the entire analysis result without reflecting the differences between upper and lower shadow features to the correction processing.

In step 1409, the PC 150 performs the collation according to the following rules.

Collation rule 1: If a binding portion of the entire result is involved in the upper and lower detailed results, the PC 150 determines that the collation result is "agreed." If either the upper detailed result or the lower detailed result does not include the binding portion, the PC 150 determines that the collation result is "disagreed."

Collation rule 2: If a front edge of the entire result is involved in the upper and lower detailed results, the PC 150 determines that the collation result is "agreed." If either the upper detailed result or the lower detailed result does not include the front edge, the PC 150 determines that the collation result is "disagreed."

Collation rule 3: If the entire analysis includes only a front edge while the upper and lower detailed results include a binding portion, the PC 150 determines that the collation result is "agreed."

When the PC 150 determines that the collation result is "disagreed", the processing flow proceeds to step 1410. In step 1410, the PC 150 performs a uniform shadow correction based on the entire analysis result without considering any V-shaped/inclined state. When the PC 150 determines that a shadow detection result of the entire analysis is agreed with shadow detection results of the upper and lower detailed analyses, the processing flow proceeds to step 1411.

In step 1411, the PC 150 determines whether shadow features of the entire analysis result agree with shadow features of the upper and lower detailed results. If the shadow of the entire analysis result agrees with the shadows of the upper and lower detailed analyses, the PC 150 determines that the inclination of a binding portion and/or a front edge is relatively small and performs a uniform shadow correction based on the entire analysis result. This is effective to prevent a fine correction from being performed unnecessarily and obtain a natural correction image.

Figure 16B:
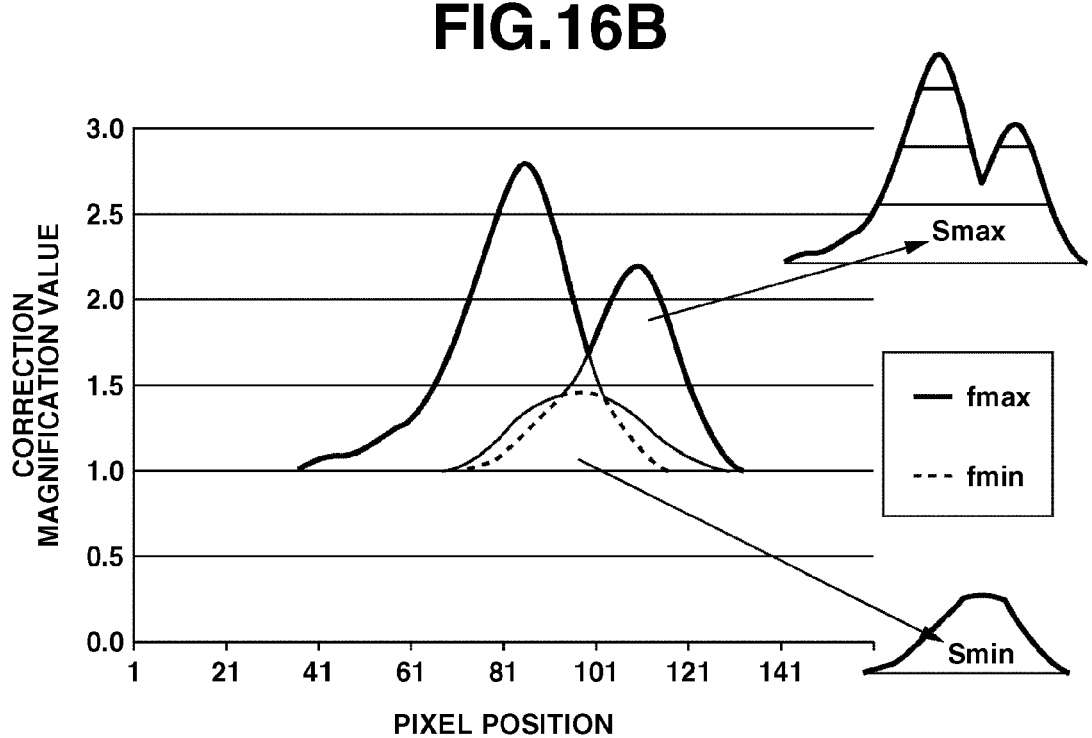

The PC 150 determines a consistency between shadow features obtained from the entire analysis and shadow features obtained from the upper and lower analyses based on the analysis results illustrated in FIGS. 16A and 16B.

The PC 150 calculates a maximum value fmax and a minimum value fmin of a correction magnification value in each pixel position based on the results of FIG. 16A. As described above, in FIG. 16A, the bold line ft represents the entire analysis result, the dotted line fa represents the result obtained from the upper-side analysis area (Ac) of the binding portion, and the thin line fb represents the result obtained from the lower-side analysis area (Bc) of the binding portion.

Namely, $$fmax(i) = \max\{fa(i), fb(i), ft(i)\} \tag{21}$$

$$fmin(i) = \min\{fa(i), fb(i), ft(i)\} \tag{22}$$

where i is a variable representing the pixel position, max{ } indicates a function obtaining a maximum value, and min{ } indicates a function obtaining a minimum value.

The PC 150 obtains integrated values Smax and Smin based on the following formulas.

$$Smax = \Sigma(fmax(i) - 1.0) \tag{23}$$

$$Smin = \Sigma(fmin(i) - 1.0) \tag{24}$$

FIG. 16B illustrates fmax, Smax, fmin, and Smin. Furthermore, the PC 150 calculates Kt based on Smin and Smax according to the following formula.

$$Kt = Smax/Smin \tag{25}$$

If the degree of a V-shaped/inclined state is relatively small, the lines fa and fb are similar to the line ft and the maximum and minimum values fmax and fmin are similar. In other word, a difference value between Smax and Smin is small and Kt is almost equal to "1.0". If the inclination is large, an overlap between fa and fb is small and the value of fmin(i) is close to "1.0" In this case, Smin is a small value and Kt is a large value.

As described above, Kt is a feature quantity representing the degree of consistency between the entire shadow and the upper/lower shadow regions. Kt is a value determining the V-shaped state of a binding portion or the inclination of a front edge. If the V-shaped/inclined state is small, Kt is close to the minimum value (=1.0). If the V-shaped/inclined state is large, Kt is a large value.

In step 1412, the PC 150 compares Kt calculated in step 1411 with predetermined thresholds KtOff and KtOn and determines whether the correction can be performed with reference to the V-shaped/inclined state. To obtain a preferable shadow luminance correction result, it is useful to determine KtOff and KtOn based on the analysis of numerous real images including binding portions.

For example, KtOff and KtOn can be set to "1.2" and "2.0" (i.e., KtOff=1.2 and KtOn=2.0). The PC 150 compares the feature quantity Kt with the thresholds KtOff and KtOn, and determines the consistency (i.e., the degree of V-shape or the angle of inclination) between the entire shadow features and the upper and lower shadow features.

If a relationship "Kt<KtOff" is satisfied, the PC 150 determines that the V-shaped/inclined state is small. Thus, in step 1410, the PC 150 performs uniform correction processing based on the entire analysis result (ft). If a relationship "Kt>KtOn" is satisfied, the PC 150 determines that upper and lower shadow features are different from each other and the V-shaped/inclined state is large. Thus, in step 1414, the PC 150 performs a shadow luminance correction based on the upper and lower detailed analysis results (fa, fb).

If a relationship "KtOff≦Kt≦KtOn" is satisfied, the processing flow proceeds to step 1413. In step 1413, the PC 150 calculates a luminance correction table (fa2, fb2) that is a combination of the entire analysis result (ft) and the upper and lower detailed analysis results (fa, fb). The PC 150 performs a shadow luminance correction based on the obtained luminance correction table.

As described above, the present embodiment selects one of three different corrections considering the consistency and therefore can obtain natural correction effects depending on the V-shaped/inclined state.

To combine the entire analysis result (ft) with the upper and lower detailed analysis results (fa, fb), the PC 150 calculates a variable KtRatio based on Kt, KtOn, and KtOff according to the following formula.

$$KtRatio=(Kt-KtOff)/(KtOn-KtOff) \quad (26)$$

Figure 17:
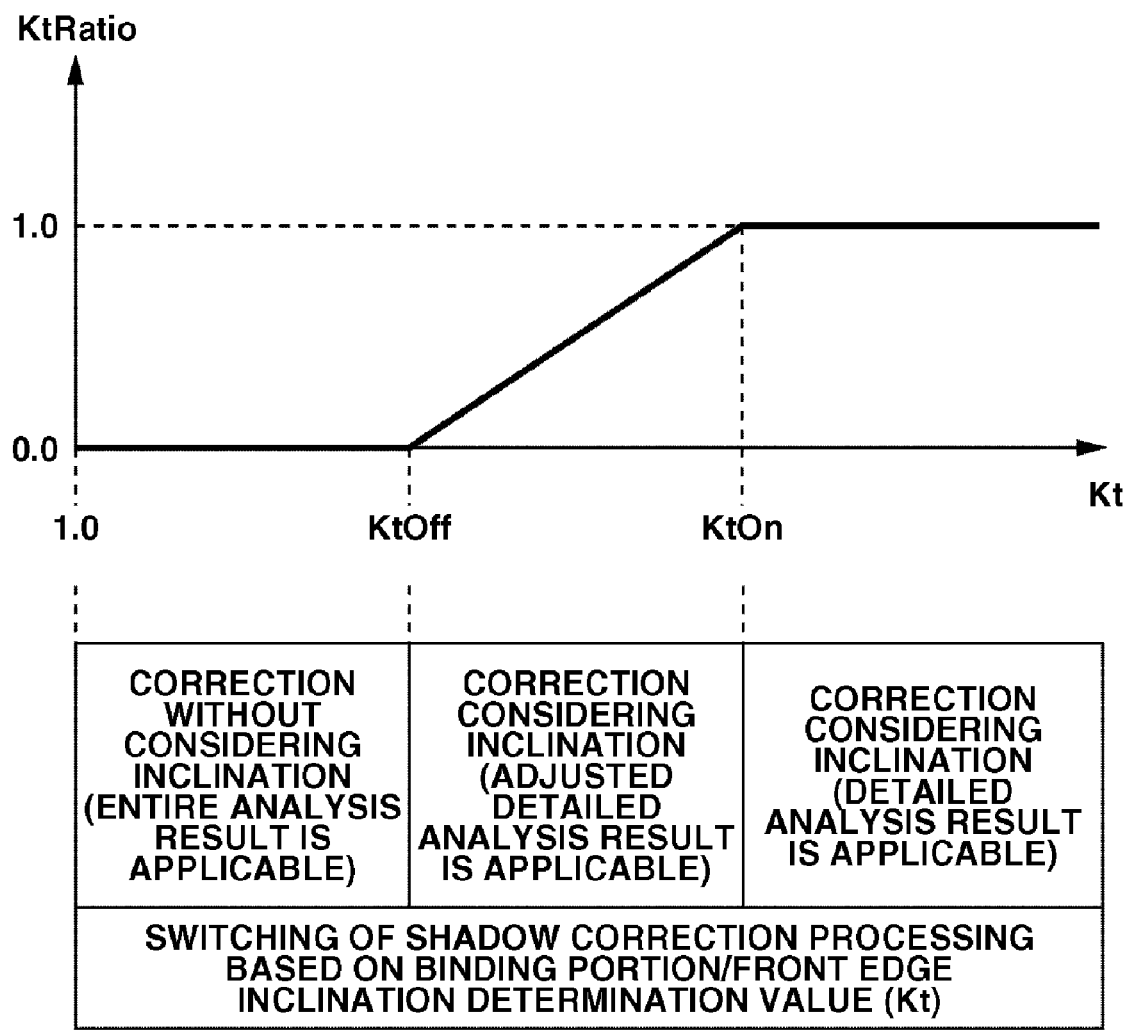
FIG. 17 is a graph illustrating exemplary shadow luminance correction processing that is variable depending on a V-shaped/inclined state.

KtRatio is a feature quantity representing the necessity of a V-shaped/inclined correction which can be expressed as a value in a range from "0.0" to "1.0". When KtRatio is "0.0", the PC 150 performs uniform correction processing based on the entire analysis result (ft). When KtRatio is "1.0", the PC 150 performs correction processing based on the upper and lower detailed analysis results (fa, fb) FIG. 17 illustrates a relationship between Kt and KtRatio, together with determination in step 1412.

An exemplary combination of the entire analysis result (ft) and the upper and lower detailed analysis results (fa, fb) is described below with reference to the luminance correction tables illustrated in FIG. 16A.

Figure 18A:
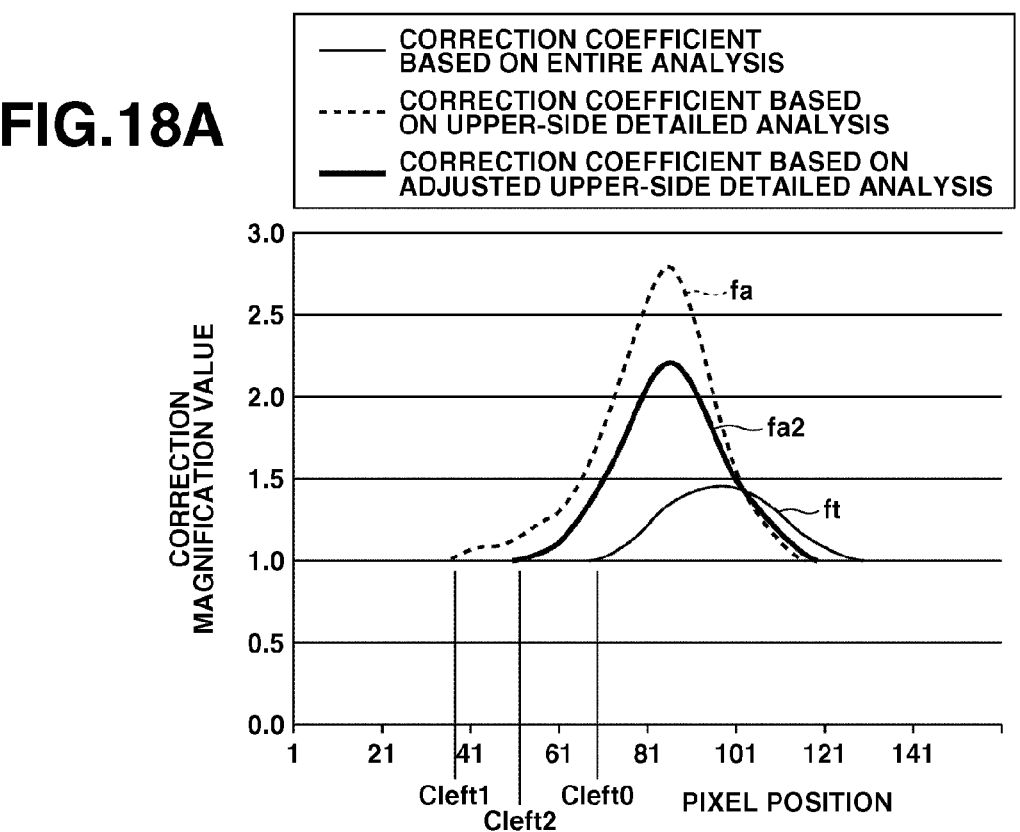
FIGS. 18A and 18B are graphs illustrating an exemplary combination of shadow luminance correction coefficients obtained by a partial image analysis and shadow luminance correction coefficients obtained by an entire image analysis.

FIG. 18A illustrates an upper-side composite correction table (fa2) obtained from a combination of the entire analysis result (ft) and the upper-side detailed analysis result (fa), when KtRatio is approximately 0.4. The PC 150 calculates a left edge position (Cleft2) of an area subjected to a luminance correction using the composite correction table, based on a left edge position (Cleft0) of the entire analysis result and a left edge position (Cleft1) of the upper-side detailed analysis result according to the following formula.

$$Cleft2=Cleft9+(Cleft1-Cleft0)\times KtRatio \quad (27)$$

When CleftIn represents a larger one of Cleft0 and Cleft1, the PC 150 calculates fa2(i) in a range of "Cleft2≦i<CleftIn" according to the following formula.

$$fa2(i)=(ft(i)\times(1-KtRatio)+fa(i)\times KtRatio)\times(Cleft2-i)/(Cleft2-CleftIn) \quad (28)$$

The PC 150 calculates fa2(i) in a range of "CleftIn≦i" according to the following formula.

$$fa2(i)=ft(i)\times(1-KtRatio)+fa(i)\times KtRatio \quad (29)$$

Similarly, the PC 150 calculates a right edge position (Cright2) of the area subjected to a luminance correction using the composite correction table as well as a right side of the composite correction table.

Figure 18B:
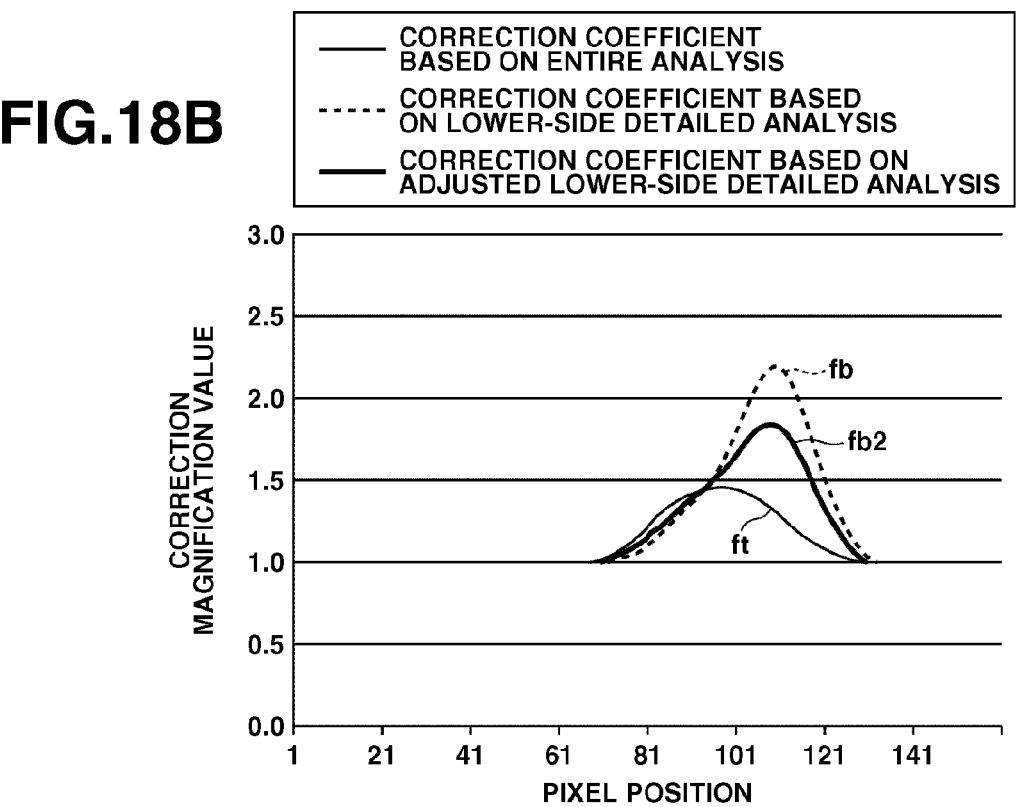

FIG. 18B illustrates a lower-side composite correction table (fb2) obtained from a combination of the entire analysis result (ft) and the lower-side detailed analysis result (fb). If an inclined front edge is detected, the PC 150 performs processing for forming a composite luminance correction table for the front edge based on KtRatio calculated from the binding portion. If there is no binding portion and only a front edge is detected in an image, the PC 150 calculates Kt and KtRatio based on the analysis result of the front edge according to the above-described method and performs the processing for forming a composite luminance correction table for the front edge.

To correct the luminance of a shadow of a V-shaped/inclined binding portion, the PC 150 correlates the upper and lower detailed analysis correction tables (fa, fb) or upper and lower composite correction tables (fa2, fb2). To this end, the PC 150 uses correction table characteristics functions (ga, gb) obtained based on change characteristics of the upper and lower correction tables.

Figure 19A:
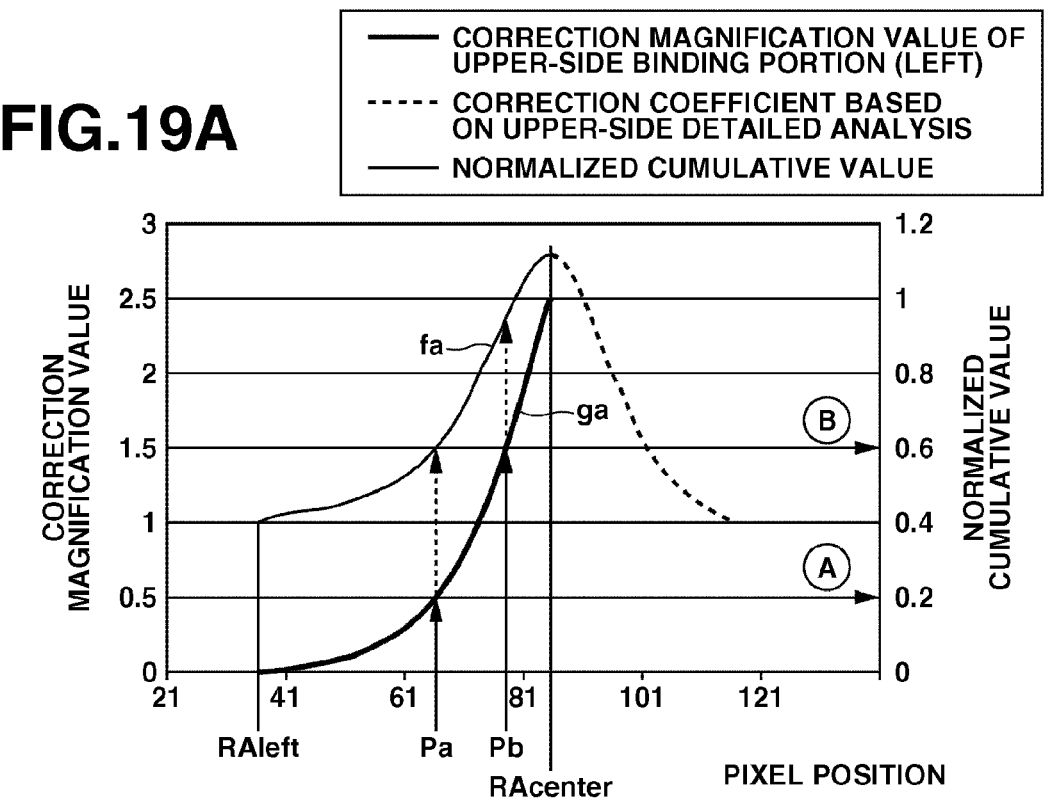
FIGS. 19A and 19B are graphs illustrating exemplary processing for correlating the shadow luminance correction coefficients between the upper and lower regions of a binding portion.
Figure 19B:
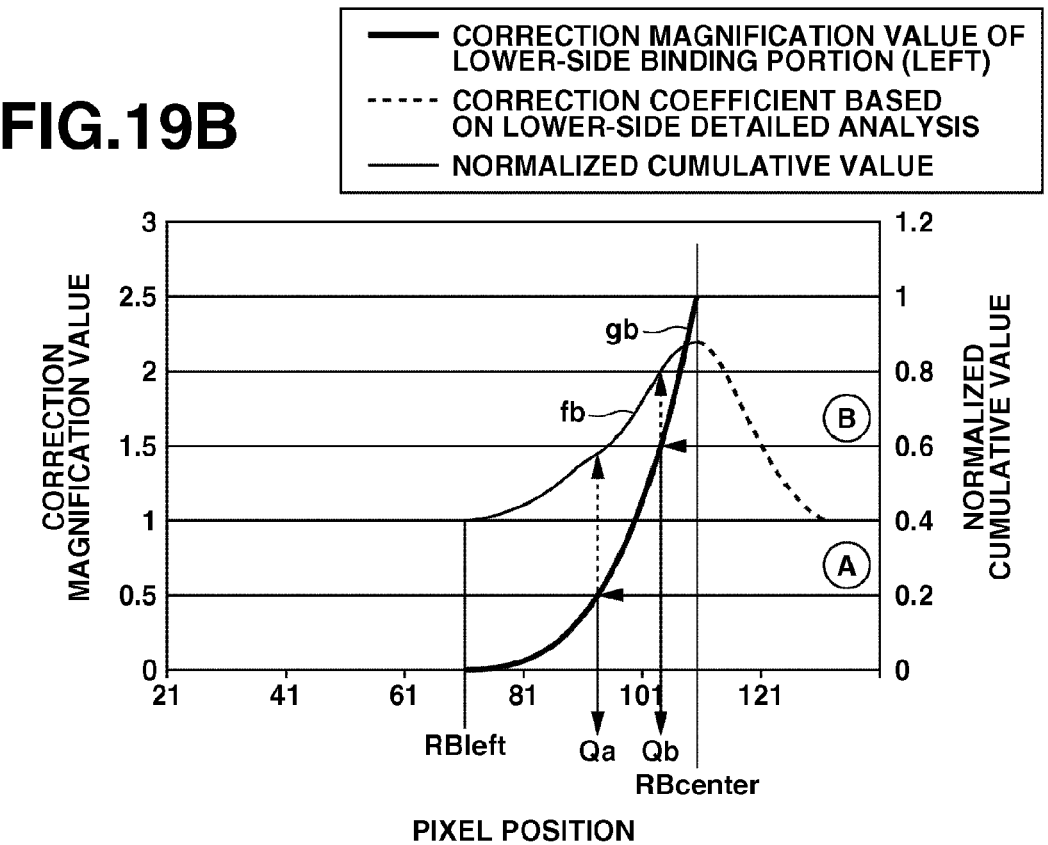

FIG. 19A illustrates an exemplary relationship between the upper binding portion correction table fa and the correction table characteristics function ga. FIG. 19B illustrates an exemplary relationship between the lower binding portion correction table fb and the correction table characteristics function gb. The following description for the left side of a binding portion can be similarly applied to the right side of a binding portion.

The PC 150 detects a position i=RAcenter where an upper-side correction table fa(i) is maximized and designates the detected position as a center position of the upper binding portion. The PC 150 cumulatively calculates (fa(i)−1.0) from a left edge i=RAleft to i=RAcenter of the upper-side correction table fa(i).

The PC 150 obtains a correction table characteristics function ga(i) which results from the cumulative value at each position i normalized by the cumulative value at the RAcenter. The correction table characteristics function ga(i) is an increasing function that has a value of "0.0" at an edge of the binding portion and "1.0" at the center of the binding portion. Similarly, the PC 150 calculates a lower-side correction table characteristics function gb(i) in a range from a position i=RBcenter where the lower-side correction table fb(i) is maximized and a left edge i=RBleft of the lower-side correction table fb(i).

The correction table characteristics functions ga(i) and gb(i) can correlate the correction tables fa(i) and fb(i). A pixel position Pa of the upper-side shadow of the binding portion has a value ga(Pa). A pixel position Qa of the lower-side shadow of the binding portion has a value gb(Qa). The value ga(Pa) is equal to the value gb(Qa). Thus, the pixel positions Pa and Qa can be correlated with each other.

When the position Pa of the upper-side shadow having a luminance correction value fa(Pa) is correlated with the position Qa of the lower-side shadow having a luminance correction value fb(Qa), the PC 150 performs later-described image luminance correction processing.

Next, in step 1415, the PC 150 correlates the correction tables obtained from the upper and lower detailed analysis results of a front edge.

As described above, the binding portion of a book document requires the correlation processing using the correction table characteristics functions because the width of a shadow and the luminance greatly change depending on the placement of a document placed on a platen and a pressing force applied on a platen cover.

However, regarding the shadow of a front edge, a front edge of a book document may not be entirely involved in an image. Furthermore, a simple correction can be used to sufficiently correct the luminance of the front edge shadow. Therefore, the PC 150 performs correlation processing based on a pixel distance from a start position of the front edge.

Figure 20A:
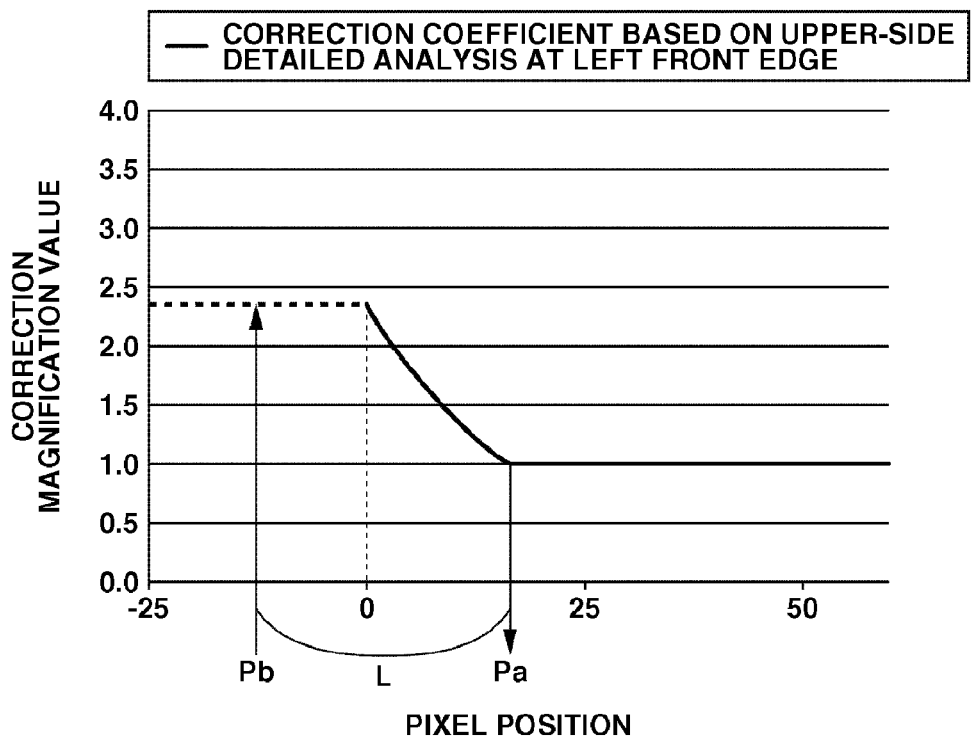
FIGS. 20A and 20B are graphs illustrating exemplary processing for correlating the shadow luminance correction coefficients between the upper and lower regions of a front edge.
Figure 20B:
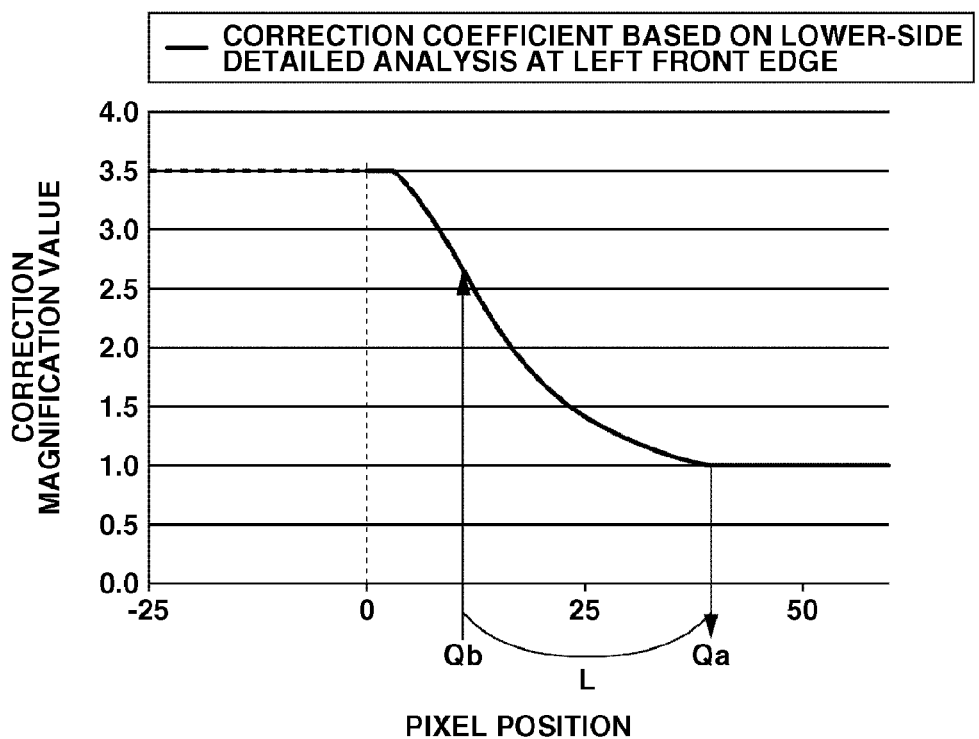

FIG. 20A and 20B illustrate analysis results of a left-hand front edge. FIG. 20A illustrates a correction table obtained from the analysis of an upper side of the front edge (Ae in FIG. 15), and FIG. 20B illustrates a correction table obtained from the analysis of a lower side of the front edge (Be in FIG. 15).

First, the PC 150 determines a positional relationship between start positions of the shadow region of a front edge. In FIG. 20A, the position Pa is a start position of the upper-side analysis area of the front edge. In FIG. 20B, the position Qa is a start position of the lower-side analysis area of the front edge. Thus, the PC 150 correlates the position Pa and the position Qa.

Furthermore, the PC 150 correlates a pixel Pb positioned at a distance L from Pa and a pixel Qb positioned at a distance L from Qa. According to the examples illustrated in FIGS. 20A and 20B, an image width of the upper-side front edge is narrower than that of the lower-side front edge. Therefore, it is useful to use a correction value at a negative pixel position which can be obtained by extrapolating a correction value at the position 0. FIGS. 15, 20A, and 20B include an image or data of only the left-hand front edge of a book document. Similar processing can be applied to a right-hand front edge of a book document if the image includes the right-hand front edge.

Through the processing of steps 1414 and 1415, the PC 150 can determine the relationship between the correction tables obtained from the upper side of a binding portion and/or a front edge of a document image and the correction tables obtained from the lower side of a binding portion and/or a front edge.

In step 1416, the PC 150 performs shadow correction processing considering the V-shaped/inclined state and terminates the shadow image analysis processing.

Figure 21:
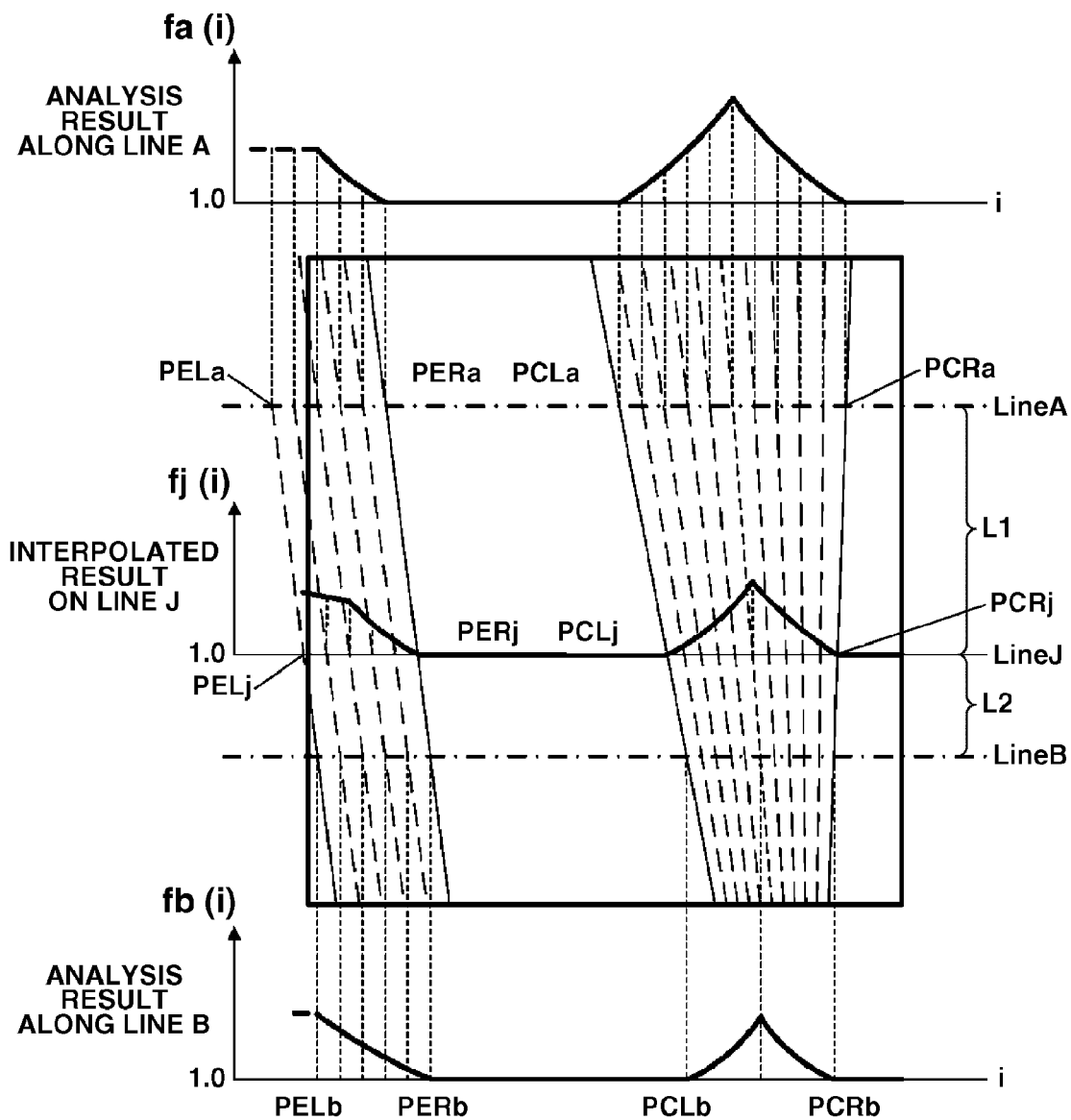
FIG. 21 illustrates exemplary processing for calculating interior division values of a luminance correction coefficient table obtained from an inclined book document image.

FIG. 21 illustrates a luminance correction coefficient table fj(i) at a line position Line J obtained when a binding portion is in a V-shaped/inclined state, together with detailed analysis results fa(i) and fb(i) calculated in the vicinity of Line A and Line B. L1 represents the distance between Line A and Line J, and L2 represents the distance between Line J and Line B. If Line J is positioned above Line A, L1 has a negative value.

In the shadow correction processing using fa(i) and fb(i), the PC 150 calculates a shadow correction range on the Line J based on an interior division of L1:L2 between edge pixel positions of the shadow on the Line A and the Line B.

For example, the PC 150 calculates a right edge pixel position PERj of the front edge on the Line J according to the following formula.

$$PERj=(PERa \times L2+PERb \times L1)/(L1+L2) \quad (30)$$

The PC 150 calculates a left edge pixel position PCLj of the binding portion on the Line J according to the following formula.

$$PCLj=(PCLa \times L2+PCLb \times L1)/(L1+L2) \quad (31)$$

PERa represents a right edge pixel position of the front edge on or near the Line A. PCLa represents a left edge pixel position of the binding portion on or near the Line A. PERb represents a right edge pixel position of the front edge on or near the Line B. PCLb represents a left edge pixel position of the binding portion on or near the Line B.

Similarly, the PC 150 calculates a left edge pixel position PELj of the front edge on the Line J and a right edge pixel position PCRj of the binding portion on the Line J. A left edge pixel position PELa of the front edge on the Line A is positioned out of the image area.

$$PELa=PERa-(PERb-PELb) \quad (32)$$

Figure 22:
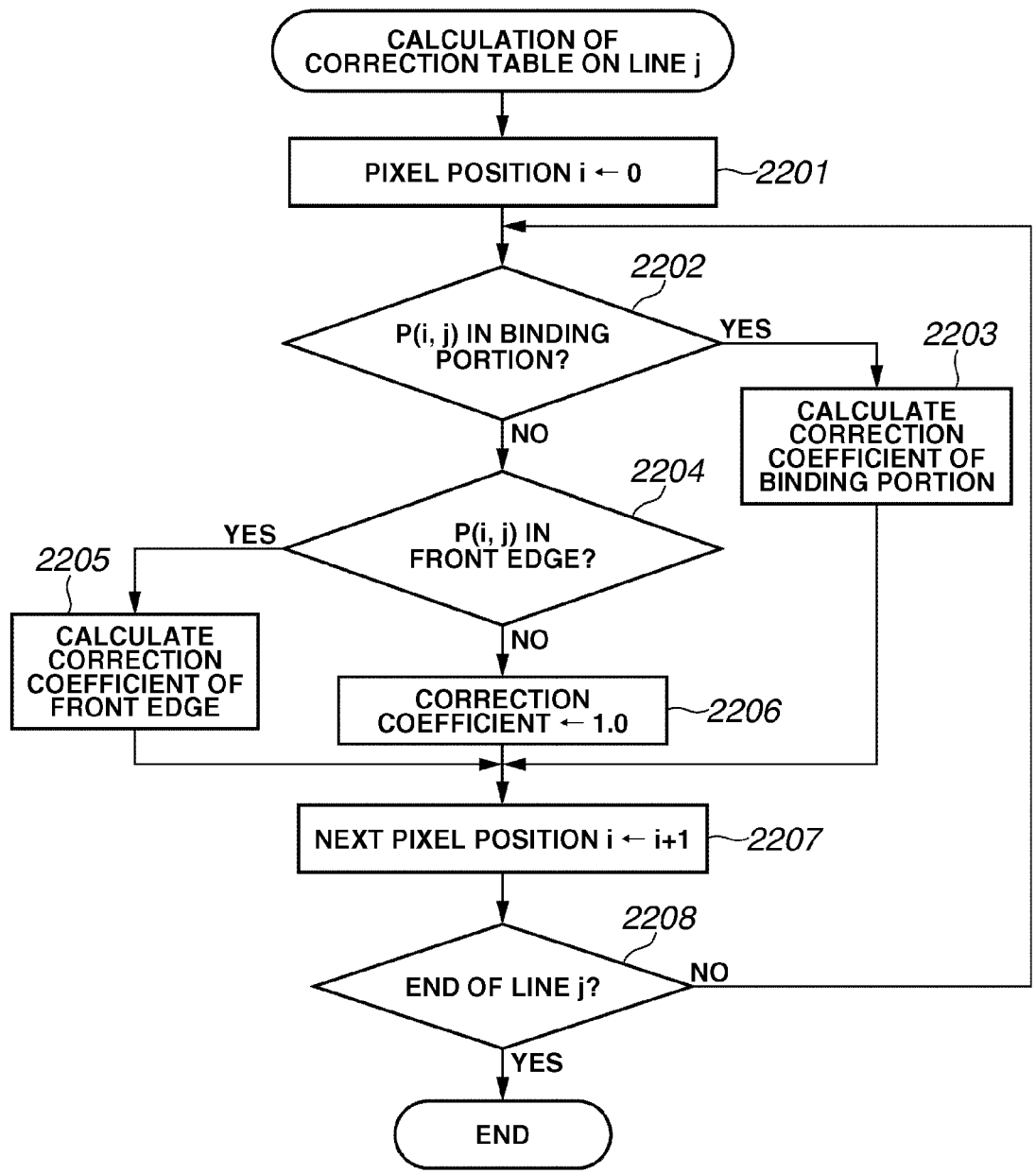
FIG. 22 is a flowchart illustrating exemplary processing for calculating a luminance correction coefficient table.

FIG. 22 is a flowchart illustrating exemplary processing for calculating a luminance correction coefficient table on the Line J. In FIG. 22, P(i,j) represents a pixel of pixel position i on the Line J.

In step 2201, the PC 150 initializes the pixel position i to 0 (i.e., the left edge of an image). In step 2202, the PC 150 determines whether the pixel P(i,j) is within an area of the binding portion. More specifically, if a relationship "PCLj≦i≦PCRj" is satisfied, the PC 150 determines that the pixel P(i,j) is within the area of the binding portion. In step 2203, the PC 150 calculates a correction coefficient of the binding portion area.

Figure 23A:
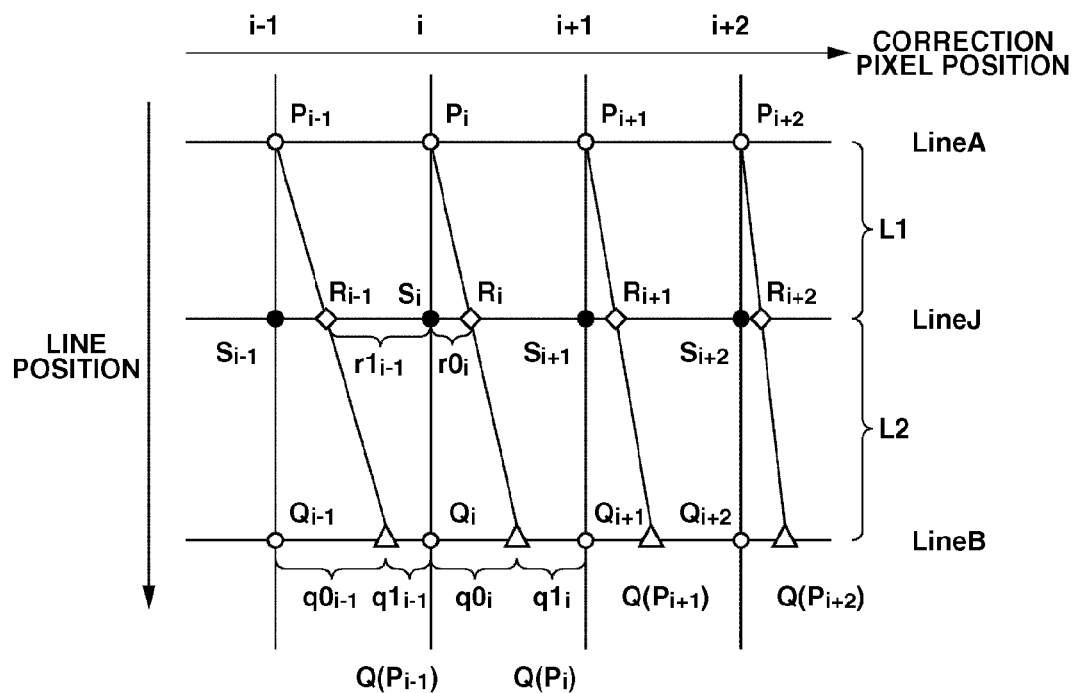
FIGS. 23A and 23B illustrate exemplary processing for calculating a luminance correction coefficient table.

The correction coefficient calculation for the binding portion area is described below in more detail with reference to FIGS. 19A and 19B and FIG. 23A. In FIG. 23A, each white circle on the Line A or Line B represents a pixel position (Pi, Qi) having a luminance correction value having been already calculated. Each black circle on the Line J represents a pixel position (Si) where a luminance correction value is to be calculated. Each white triangle Q(Pi) on the Line B represents a position correlated with the position Pi on the Line A, which can be obtained using the above-described correction table characteristics functions. Each white rhombus on the Line J represents an interpolated value obtained from an interior division of L1:L2 between Pi and Q(Pi).

The PC 150 calculates Q(Pi) corresponding to Pi and a correction value fb'(Pi) for the position Pi. As illustrated in FIGS. 19A and 19B, the PC 150 detects a pixel position k satisfying a relationship "gb(k)<ga(Pi)≦gb(k+1)" to obtain a value gb(Q(Pi)) agreeing with a value ga(Pi) of the correction table characteristics function ga. The pixel position k corresponds to Qi in FIG. 23A. Q(Pi) is an intermediate position between Qi and Qi+1 resulting from an interior division using a fractional part q0i of ga(Pi). The following interior division formula is applied to gb(Q(Pi)).

$$fb'(Pi)=gb(k) \times (1-q0i)+gb(k+1) \times q0i \quad (33)$$

Thus, the PC 150 obtains a correction value fa(Pi) on the Line A and the correction value fb'(Pi) of the position Q(Pi) on the Line B.

Furthermore, the PC 150 calculates a position Ri where a line connecting Pi and Q(Pi) crosses the Line J, based on the position resulting from the interior division of L1:L2 between Pi and Q(Pi). Then, the PC 150 calculates a correction value fj(Ri) for the obtained position Ri.

$$Ri=(L1 \times Q(Pi)+L2 \times Pi)/(L1+L2)$$

$$fj(Ri)=(L1 \times fb'(Pi)+L2 \times fa(i))/(L1+L2) \qquad (34)$$

In general, the position Ri includes a fractional part r0i. The PC 150 successively calculates Ri corresponding to Pi, and obtains a left-side position Rl and a right-side position Rr closest to the pixel position Si on the Line J. Then, the PC 150 obtains fj(i) based on a fractional part r0l of Rl, a correction value fj(Rl), a fractional part r0r of Rr, and a correction value fj(Rr).

$$fj(i)=r0r \times fj(Rl)+(1-r0l) \times fj(Rr) \qquad (35)$$

Although the procedure for calculating fj(i) from Pi has been described, fj(i) can be also obtained by successively calculating from a left edge pixel position of the binding portion to the right.

If the pixel P(i,j) is not present within the binding portion area (i.e., NO in step 2202), the processing flow proceeds to step 2204. In step 2204, the PC 150 determines whether the pixel P(i,j) is within an area of the front edge. More specifically, if a relationship "PELj≦i≦PERj" is satisfied, the PC 150 determines that the pixel P(i,j) is within the area of the front edge. Thus, in step 2205, the PC 150 calculates a correction coefficient of the front edge area.

If the pixel P(i,j) is not present within the front edge area (i.e., NO in step 2204), the processing flow proceeds to step 2206 wherein the PC 150 sets the luminance correction coefficient to "1.0".

Then, in step 2207, the PC 150 increments the pixel position i by "1" to calculate a correction value of the next pixel position.

In step 2208, the PC 150 determines whether correction coefficients of all pixels on the Line J have been calculated. If the calculation processing for all pixels is entirely completed, the PC 150 terminates the processing of this routine.

Figure 23B:
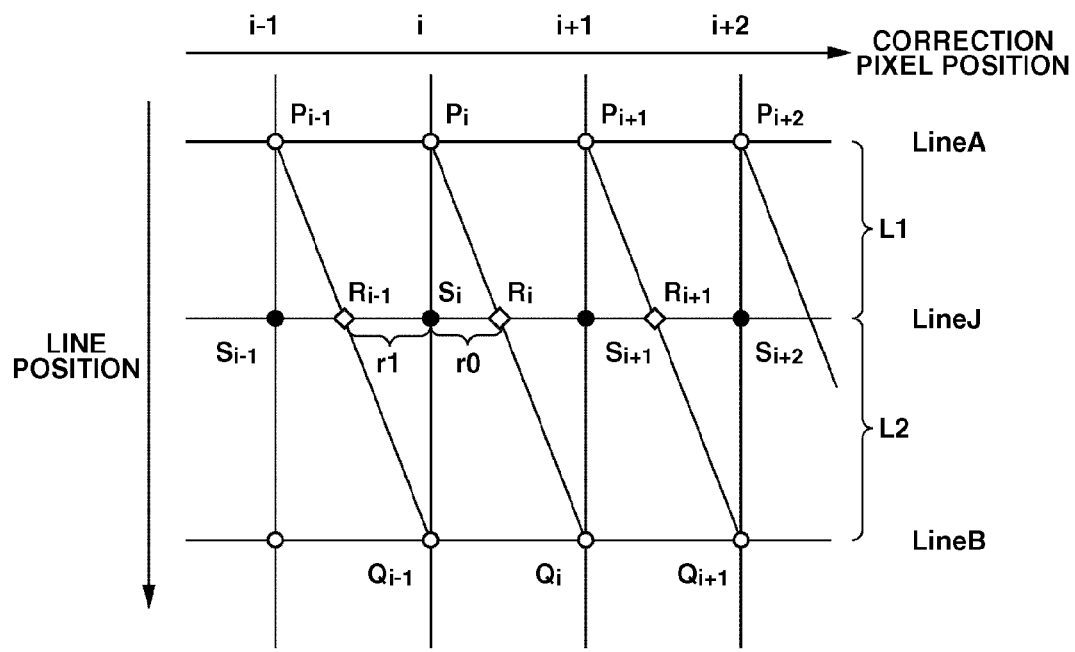

The correction coefficient calculation in the front edge area is described below in more detail with reference to FIGS. 20A, 20B, and 23B. When Pa represents an edge pixel position of the front edge on the line A and Qa represents an edge pixel position of the front edge on the Line B, the following formula expresses Qi corresponding to Pi.

$$Qi=Pi+(Qa-Pa) \qquad (36)$$

fa(Pi) and fb(Qi) are correction values.

Furthermore, the PC 150 calculates a position Ri where a line connecting Pi and Qi crosses the Line J, based on the position obtainable from the interior division of L1:L2 between Pi and Qi. Then, the PC 150 calculates a correction value fj(Ri) at the obtained position Ri.

$$Ri=(L1 \times Qi+L2 \times Pi)/(L1+L2) \qquad (37)$$

$$fj(Ri)=(L1 \times fb(Qi)+L2 \times fa(i))/(L1+L2) \qquad (38)$$

In general, the position Ri includes a fractional part r0. In the front edge, the positional difference between Pi and Qi is a constant value equal to (Qa−Pa) and r0 has the same value in the same front edge area. The PC 150 obtains a correction value fj(i) of a left-side pixel position Si next to the position Ri on the Line J.

$$fj(i)=r0 \times fj(R(i-1))+(1-r0) \times fj(Ri) \qquad (39)$$

As described above, the PC 150 can calculate the luminance correction coefficient table on the Line J. Thus, the present embodiment can appropriately obtain luminance correction coefficients at respective pixel positions on all lines of an image by performing the above-described calculations, for adequately correcting the luminance of the shadow of a V-shaped/inclined binding portion or the shadow of an inclined front edge.

The present embodiment can determine a shadow region of a binding portion in a read image of a book document based on a cumulative comparison of luminance changes between neighboring pixel sequences. Accordingly, even if a border line of a book document is positioned out of a reading area, the present embodiment can detect and correct the shadow of a binding portion. Even if an image includes only one side or part of spread pages of a book document, the present embodiment can correct a shadow involved in the image. Moreover, if a magazine or color document image includes a surrounding (e.g., design, pattern, and photograph) other than characters, the present embodiment can appropriately correct the unevenness in luminance caused by a shadow without modifying the design/pattern or the photograph.

Fourth Exemplary Embodiment

A fourth exemplary embodiment of the present invention is similar to the above-described first, second, and third exemplary embodiments in the arrangement including the image reading apparatus 100 and the PC 150 illustrated in FIG. 1 and the operation for obtaining an image including luminance-corrected shadows of a binding portion and front edges of a book document. The fourth exemplary embodiment performs processing for interpolating shadow luminance correction coefficients.

The second exemplary embodiment can realize a continuous and smooth correction applicable to a shadow of a binding portion of a document including color characters (or any other color document). However, if a contact image sensor (CIS) is used to read a document, color shifts may occur at the edge of a character/graphic image because RGB data are read while the sensor moves. Therefore, the obtained shadow correction coefficients may include the effects of character/graphic pixels. In such cases, a graph of the obtained shadow correction coefficients includes stepwise portions, as illustrated in FIG. 24.

Figure 24:
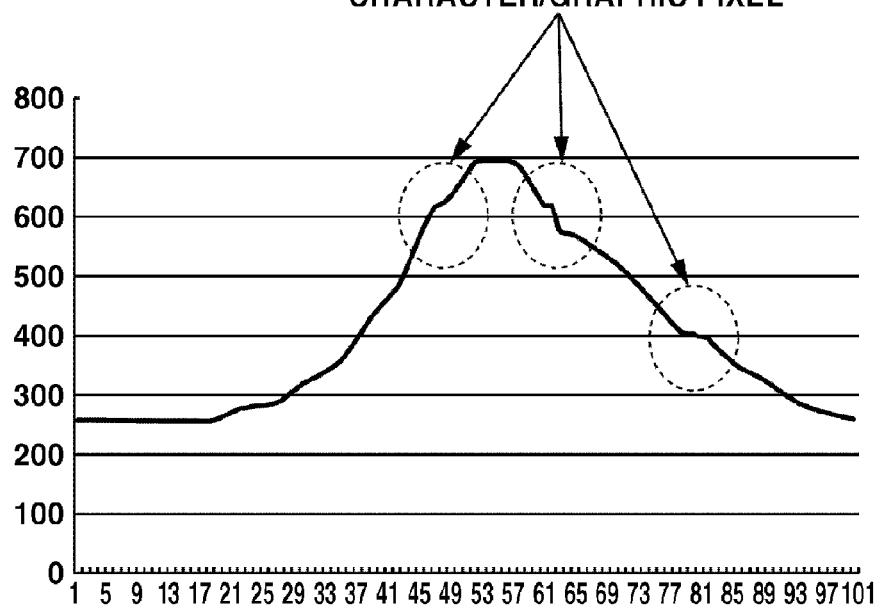
FIG. 24 is a graph illustrating an example of shadow luminance correction coefficients that include effects of characters and graphic pixels.
Figures 26A, 26B:
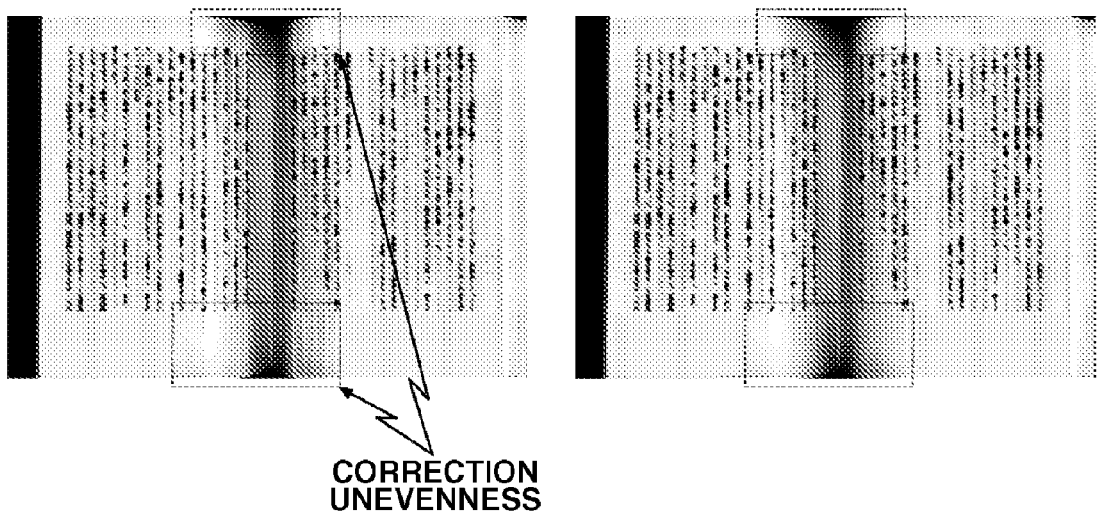
FIGS. 26A and 26B illustrate a comparison between a shadow correction result obtained from the pre-interpolation shadow luminance correction coefficients and a shadow correction result obtained from the post-interpolation shadow luminance correction coefficients.

If the correction is performed using the shadow correction coefficients of FIG. 24, correction unevenness (stripe) appears in a marginal region of a document image including strings of character pixels as illustrated in FIG. 26A.

Hence, the present embodiment performs correction processing using an approximate curve to eliminate stepwise portions caused by the effects of character/graphic pixels.

The present embodiment describes an interpolation method using a Bezier curve, although any other approximation method is employable. The Bezier curve is a curve defined by plural points {$P_i$} which can be referred to as control points. A point Q(t) on the curve can be generated by mixing a control point $P_i$ with a certain ratio. The mixing ratio of each control point $P_i$ continuously changes if a parameter t varies in a range from "0" to "1." When the point Q(t) continuously moves, a locus of the point Q(t) forms a Bezier curve. The following formula expresses an n-order Bezier curve.

$$Q(t)=\sum_{i=0}^{n} P_i \frac{n!}{i!(n-1)!} t^i (1-t)^{n-i} \qquad (39)$$

$$\text{where,} \sum_{i=0}^{n} \frac{n!}{i!(n-1)!} t^i (1-t)^{n-i} = 1.$$

Figure 25:
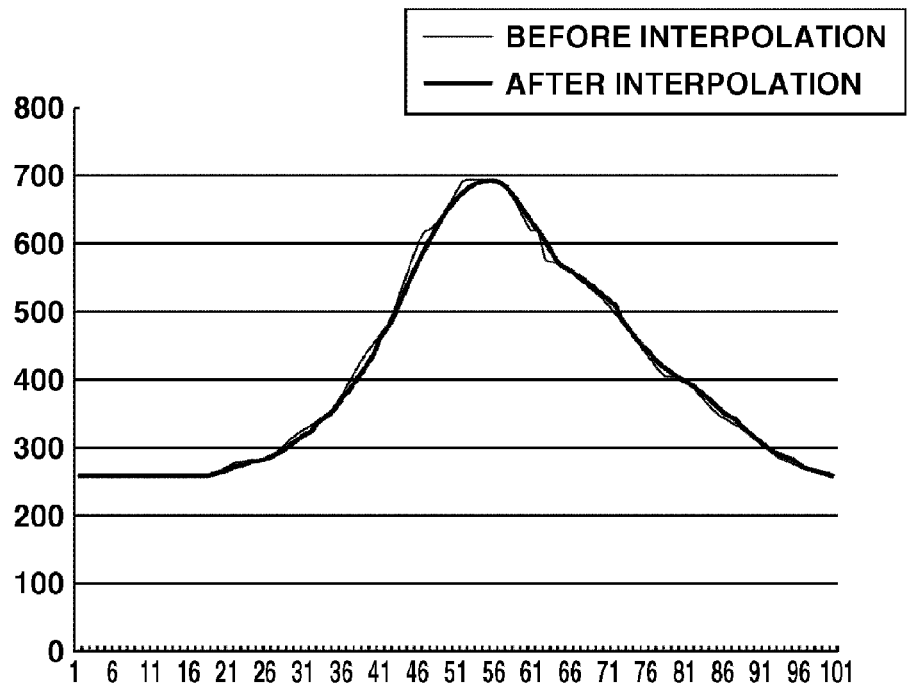
FIG. 25 is a graph illustrating a comparison between pre-interpolation shadow luminance correction coefficients and post-interpolation shadow luminance correction coefficients.

FIG. 25 is a graph illustrating interpolated shadow luminance correction coefficients obtained from a 7th-order Bezier curve (i.e., one of curves generated by the above-described formula) in comparison with non-interpolated shadow luminance correction coefficients. The interpolation using the 7-th order Bezier curve can remove the stepwise portions. As a result, the present embodiment can realize a smooth shadow correction applicable to a marginal region of a document image that includes strings of character pixels, as illustrated in FIG. 26B.

The present embodiment can appropriately calculate shadow correction coefficients even if the detection of character/graphic pixels is failed, and can apply a continuous and smooth correction to the shadow of a binding portion.

Furthermore, software program code for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions. Furthermore, the scope of an embodiment of the present invention encompasses supplying program code to a computer with a storage (or recording) medium storing the program code. In this case, the type of program can be any one of object code, interpreter program, and OS script data. A storage medium supplying the program can be selected from any one of a floppy disk, a hard disk, an optical disk, a magneto-optical (MO) disk, a compact disk—ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of an embodiment of the present invention, or compressed files of the programs having automatic installing functions, to a hard disk or other recording medium of the user.

Furthermore, the program code constituting the programs of an embodiment of the present invention can be divided into a plurality of files so that respective files are downloadable from different web sites. Namely, the scope of an embodiment of the present invention encompasses world wide web (WWW) servers that allow numerous users to download the program files so that the functions or processes of an embodiment of the present invention can be realized on their computers.

Enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on the computer can execute part or all of the actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2006-205941 filed Jul. 28, 2006 and No. 2007-167462 filed Jun. 26, 2007, which are hereby incorporated by reference herein in their entirety.

What is claimed is:

1. A method for processing image data read from a book document placed on a platen, the method comprising:

determining a target pixel of the image data as a background pixel when a difference between the target pixel and a neighboring pixel is less than a threshold, the neighboring pixel being in a first direction perpendicular to a binding portion of the book document (step 1);

performing a preliminary luminance correction calculation using a same correction value candidate for a luminance value of a background pixel positioned on a line parallel to the binding portion of the book document (step 2);

integrating an absolute value of a difference between a value obtained by the preliminary luminance correction calculation and a luminance value of a neighboring background pixel positioned in the first direction with respect to background pixels on the line, and selecting a correction value candidate that minimizes the integrated value among a plurality of correction value candidates as a correction value of the background pixel on the line (step 3);

calculating a cumulative luminance correction value for each line by successively performing a luminance correction calculation in neighboring order of the line based on the selected correction value (step 4);

extracting a shadow region of at least one of a shadow of a binding portion or a shadow of a front edge portion involved in the image data based on the cumulative luminance correction value (step 5); and performing a luminance correction on the shadow region based on the cumulative luminance correction value (step 6).

2. The method according to claim 1, further comprising:

calculating the cumulative luminance correction value on an assumption that a main scanning direction of the platen is parallel to the binding portion of the book document, and identifying the calculated cumulative luminance correction value as a cumulative luminance correction value in a sub scanning direction (step 7);

calculating the cumulative luminance correction value on an assumption that the sub scanning direction perpendicular to the main scanning direction of the platen is parallel to the binding portion of the book document, and identifying the calculated cumulative luminance correction value as a cumulative luminance correction value in the main scanning direction (step 8); and determining a direction of the binding portion of the book document based on a comparison between a distribution of the cumulative luminance correction value in the sub scanning direction and a distribution of the cumulative luminance correction value in the main scanning direction (step 9), wherein the method performs the step 5 and the step 6 based on the cumulative luminance correction value corresponding to the determined direction of the binding portion.

3. The method according to claim 1, wherein the difference between neighboring pixels of the image data is a luminance difference.

4. The method according to claim 1, wherein the difference between neighboring pixels of the image data is a color difference.

5. The method according to claim 1, further comprising:
listing combinations of candidates representing at least one of a shadow of the binding portion and a shadow of the front edge portion involved in the image data based on a distribution of the cumulative luminance correction value; and
selecting a target combination of candidates to be corrected from among the listed combinations of candidates.

6. The method according to claim 1, further comprising:
applying image processing to low-resolution image data obtained by reading the book document at a low resolution;
selecting a combination including at least one of a shadow of the binding portion and a shadow of the front edge to be corrected; and
applying the image processing of the step 6 corresponding to the selected at least one of the shadow of the binding portion and the shadow of the front edge to high-resolution image data obtained by reading the book document at a high resolution.

7. The method according to claim 6, further comprising:
calculating the correction value for the high-resolution image data by interpolating the correction value obtained from the low-resolution image data; and
applying the image processing of the step 6 to the high-resolution image data.

8. The method according to claim 1, wherein the luminance correction in the step 6 includes multiplying a same correction magnification with a luminance correction value of a neighboring pixel as a correction calculation for a pixel on the same line.

9. The method according to claim 1, further comprising:
generating an extended analysis area wider than the shadow region extracted in the step 5;
generating two partial analysis areas in the analysis area which are spaced in a direction of the binding portion;
performing the processing of the steps 1, 2, 3, and 4 in the two partial analysis areas;
generating cumulative luminance correction values in the respective partial analysis areas (step 10); and
performing an interpolation calculation of a correction value of each pixel involved in the shadow region based on a relationship between the cumulative luminance correction values in the respective partial analysis areas generated in the step 10 (step 11).

10. The method according to claim 9, wherein the interpolation calculation in the step 11 is performed based on a feature quantity table calculated from the cumulative luminance correction values generated in the step 10.

11. The method according to claim 9, wherein the two partial analysis areas are located away from top and bottom edges of the book document.

12. The method according to claim 9, wherein the step 11 includes performing interpolation processing for correcting a shadow width difference between the two partial analysis areas for a shadow of the binding portion, and performing interpolation processing without correcting the shadow width difference for a shadow of the front edge.

13. The method according to claim 9, wherein the luminance correction is performed based on the shadow region of at least one of the shadow of the binding portion or the shadow of the front edge portion extracted in the step 5, if the shadow region of at least one of the shadow of the binding portion or the shadow of the front edge portion extracted in the step 5 disagrees with a shadow region of at least one of a shadow of the binding portion and a shadow of the front edge portion extracted from the cumulative luminance correction values generated in the step 10, of if the cumulative luminance correction values are not generated in the step 10.

14. The method according to claim 9, further comprising:
comparing features between a first luminance correction table obtained from cumulative luminance correction values calculated based on the entire image data in the step 4 and a second luminance correction table obtained from cumulative luminance correction values calculated based on image data in the partial analysis areas in the step 4; and
performing the luminance correction based on the first luminance correction table or a composite table obtained from the first and second luminance correction tables according to a degree of agreement in the comparison.

15. The method according to claim 1, further comprising:
correcting the cumulative luminance correction value using an approximate curve; and
performing the luminance correction based on the corrected cumulative luminance correction value.

16. A computer-readable medium storing instructions which, when executed by an apparatus, causes the apparatus to perform operations comprising:
obtaining image data generated by scanning and reading a book document placed on a platen of an image scanner;
determining a target pixel of the image data as a background pixel when a difference between the target pixel and a neighboring pixel is less than a threshold, the neighboring pixel being in a first direction perpendicular to a binding portion of the book document;
performing a preliminary luminance correction calculation using a correction value candidate for a luminance value of a background pixel positioned on a line parallel to the binding portion of the book document;
selecting a correction value candidate from a plurality of correction value candidates as a correction value of the background pixel on the line;
calculating a cumulative luminance correction value for each line by successively performing a luminance correction calculation in neighboring order of the line based on the selected correction value;
extracting a shadow region of at least one of a shadow of a binding portion or a shadow of a front edge portion included in the image data based on the cumulative luminance correction value; and
performing a luminance correction on the shadow region based on the cumulative luminance correction value.

17. The computer-readable medium according to claim 16, wherein the selecting the correction value candidate comprises:
integrating an absolute value of a difference between a value obtained by the preliminary luminance correction calculation and a luminance value of a neighboring background pixel positioned in the first direction with respect to background pixels on the line; and
selecting a correction value candidate that minimizes the integrated value among the plurality correction value candidates as a correction value of the background pixel on the line.

* * * * *